United States Patent [19]
Koyama

[11] Patent Number: 5,940,849
[45] Date of Patent: Aug. 17, 1999

[54] INFORMATION MEMORY APPARATUS AND LIBRARY APPARATUS USING A SINGLE MAGNETIC TAPE SHARED WITH A PLURALITY OF TASKS

[75] Inventor: Susumu Koyama, Kawasaki, Japan

[73] Assignees: Fujitsu Limited, Kawasaki, Japan; SUIMYN Storage Corporation, Santa Clara, Calif.

[21] Appl. No.: 08/658,841

[22] Filed: May 31, 1996

[30] Foreign Application Priority Data

Dec. 8, 1995 [JP] Japan .................................. 7-320908

[51] Int. Cl.⁶ ..................................................... G06F 15/02
[52] U.S. Cl. .............................. 711/4; 711/162; 711/130; 360/48
[58] Field of Search ..................... 360/72.2, 48; 395/441, 395/840, 440; 386/95

[56] References Cited

U.S. PATENT DOCUMENTS

| | | | |
|---|---|---|---|
| 4,393,445 | 7/1983 | Milligan et al. | 360/72.2 |
| 4,467,421 | 8/1984 | White | 364/200 |
| 5,070,419 | 12/1991 | Kiyonaga | 386/95 |
| 5,327,535 | 7/1994 | Ogata et al. | 395/440 |
| 5,485,321 | 1/1996 | Leonhardt et al. | 360/48 |
| 5,487,171 | 1/1996 | Dodt et al. | 395/840 |
| 5,584,008 | 12/1996 | Shimada et al. | 395/441 |
| 5,602,686 | 2/1997 | Shih | 360/48 |

FOREIGN PATENT DOCUMENTS

| | | |
|---|---|---|
| 63-14390 | 1/1988 | Japan . |
| 64-4970 | 1/1989 | Japan . |
| 5274760 | 10/1993 | Japan . |
| 6-324813 | 11/1994 | Japan . |

OTHER PUBLICATIONS

Compcon Twelfth IEEE Computer Society International Conference; "More Practical Applications Of Trillion–Bit Mass Storage Systems", (Feb. 24–26, 1976), H. Robert Howie, Jr.: pp. 53–56.

iX—Angriff Abgewehrt; No. 11, 1995; pp. 178, 180, 182, 184, 186, 188 and 189.

Ivan Flores; Peripheral Devices; 1973; p. 298.

Primary Examiner—John W. Cabeca
Assistant Examiner—Fred F. Tzeng
Attorney, Agent, or Firm—Greer, Bruns, & Crain, Ltd.

[57] ABSTRACT

An information memory apparatus which has a single magnetic tape shared with a plurality of users or a plurality of tasks. At least one information recording medium is provided with a plurality of logical volumes. Each of the logical volumes stores a set of information and is defined as a single physical volume. A recording/reproducing unit records input information on the information recording medium and/or reproduces output information from the information recording medium. A staging device stages and destages the input information to be recorded on the information recording medium and/or the output information reproduced from the information recording medium by the recording/reproducing unit. The staging device is controlled so that the staging device stages and destages the input information and/or the output information in accordance with loading and unloading of the recording/reproducing unit.

23 Claims, 19 Drawing Sheets

Fig. 5

CELL DATA SET

| PHYSICAL VOLUME | CELL ADDRESS | LOGICAL VOL NAME |
|---|---|---|
| VOL#1111 | XXXXX | LV#AAAA LV#BBBB |
| VOLxxxx | | |
| VOLyyyy | | |
| ⋮ | | |

Fig. 6

MTU TABLE

| | MOUNT | MOUNT VOLUME | AVAILABLE LV | PROCESS FLAG |
|---|---|---|---|---|
| MTU#0 | ON | VOL#1111 | LV#AAAA LV#BBBB | ON ON |
| #1 | OFF | — | — | — |
| #2 | OFF | — | — | — |
| ⋮ | ⋮ | ⋮ | | |

Fig. 7

STAGING TABLE

| RAID SECTION | LOGICAL BLOCK ADDRESS | ASSIGN | LV NAME |
|---|---|---|---|
| 0 | $x_1 x_2 x_3 x_4 \sim y_1 y_2 y_3 y_4$ | ON | LV#AAAA |
| 1 | • | ON | LV#BBBB |
| 2 | • | OFF | — |
| 3 | • | OFF | — |
| 4 | • | OFF | — |
| ⋮ | ⋮ | ⋮ | ⋮ |

RAID SECTION:SECTION ON RAID CORRESPONDING TO LV(50MB)
LBA:ADDRESS USED FOR ACCESSING TARGET BLOCK ON RAID

Fig. 11

| CONTENTS OF LVOL1 | | |
|---|---|---|
| VOLSER | XXXXxx | |
| LV ENABLE | 1(Y)/0(N) | |
| LVOLSER | LV0 | AAAAxx   BID=xxxx |
| | LV1 | BBBBxx   BID=yyyy |
| | LV2 | CCCCxx   BID=zzzz |
| | • | • |

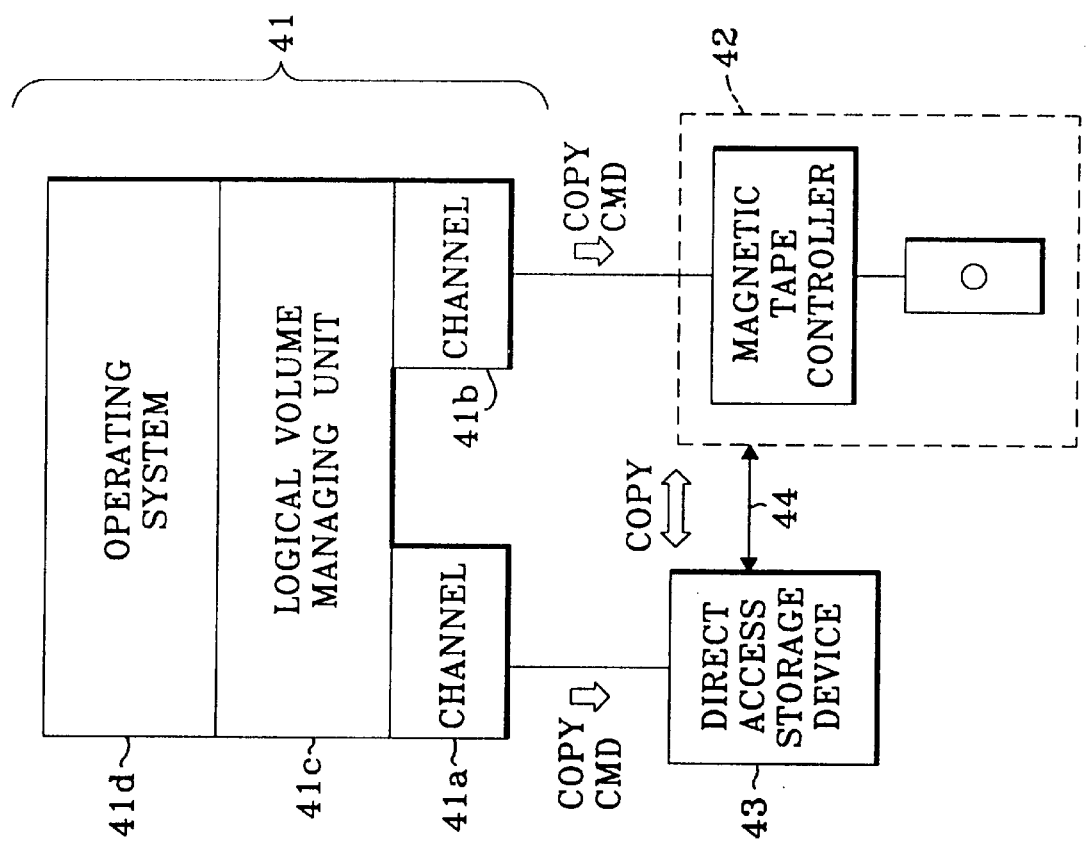

INFORMATION MEMORY APPARATUS AND LIBRARY APPARATUS USING A SINGLE MAGNETIC TAPE SHARED WITH A PLURALITY OF TASKS

BACKGROUND OF THE INVENTION

1. Field of the Invention

The present invention relates to an information memory apparatus and a library apparatus and, more particularly, to an information memory apparatus and a library apparatus for recording data on a magnetic tape.

Recently, the capacity of magnetic tapes has been increased due to as increase in recording density and an increase in the number of tracks. For example, in a cartridge-type magnetic tape used for a large-scale computer system, the data recording capacity of a single-volume tape cartridge has increased from an original capacity of 200 MB, 18 tracks to 800 MB, 36 tracks, which capacity is four times the original capacity. This was achieved by serpentining the 18 tracks and increasing the tape to a double length. Additionally, since the memory capacity can be increased about three times on average by using a data compression function, the data recording capacity of a single tape cartridge may be increased up to about 2.4 GB.

However, many users use only the leading part of the tape cartridge despite the increase in data recording capacity. That is, the actually used memory capacity of each tape cartridge has not been increased in practical use. A reason for this is that there may be many data sets (private volumes) assigned for an individual user or that the tape cartridge may be used for a task which requires a small amount of data other than large backup data. That is, the tape cartridge may be used by an individual or used for a single task which handles a small amount of data.

In order to use the tape cartridge more efficiently, it is suggested that a plurality of files be provided on a single-volume magnetic tape, which is referred to as a multi-file tape. This allows a single-tape cartridge to be shared with a plurality of persons or a plurality of tasks.

2. Description of the Related Art

FIG. 1 is a block diagram of an example of a conventional magnetic tape memory apparatus. The magnetic tape memory apparatus 51 shown in FIG. 1 comprises a magnetic tape unit 52 and a magnetic tape controller 55. The magnetic tape unit 52 records/reproduces data on a magnetic tape. The magnetic tape controller 55 controls a connection between the magnetic tape unit 52 and a host computer 54.

The magnetic tape controller 55 comprises a channel adapter 56, a device adapter 57, a buffer memory 58 and a control memory 59. The channel adapter 56 connects the magnetic tape controller 55 to a channel of the host computer 54. The device adapter 57 connects the magnetic tape controller 55 to the magnetic tape unit 52. The buffer memory 58 temporarily stores data input to or output from the magnetic tape unit 52. The control memory 59 maintains a relationship of logical volumes between the magnetic tape unit 52 and the host computer 54.

In the conventional magnetic tape memory apparatus 51, a format of the magnetic tape is determined so that a single file is recorded on a single volume of magnetic tape because it is assumed that a large capacity file is created with a single magnetic tape.

FIG. 2 is an illustration of a format of a single file recorded on a conventional magnetic tape.

In the conventional magnetic tape, a single logical volume is set in a single volume tape. The tape format of the conventional tape comprises a logical volume name memory area VOL1, headers HDR1 and HDR2, a file storing area FILE, end of file areas EOF1 and EOF2 and a tape winding area TWA, in that order, beginning from a leading end of the tape. The logical volume name memory area VOL1 is provided for identifying the logical volume set for the tape. The headers HDR1 and HDR2 store information related to a file such as capacity and contents of the file. The file storing area FILE stores the file. The areas EOF1 and EOF2 store information representing the end of file. The tape winding area TWA represents the end of the tape.

In the above-maintained tape format, only a single file is stored in a single volume magnetic tape cartridge. Accordingly, only a leading portion of the magnetic tape may be used when the tape cartridge is used with a system in which most of files created in the system contain a small amount of data or most files are managed by an individual. That causes a condition in which a large portion of tape will never be used. This reduces a used area rate of the magnetic tape for each volume.

In order to increase the used area rate of the magnetic tape, an apparatus is suggested which has a multi-file function for storing a plurality of files on a single-volume magnetic tape.

FIG. 3 is an illustration of a format of a conventional multi-file tape. As shown in FIG. 3, in the conventional multi-file tape, a single-volume tape is considered as a single logical volume. A plurality of files FILE0 to FILEN are set in the single logical volume. Access to one of the files can be made by designating a volume order number (VOL)/ serial number (SEL) and a data set order number (LABEL) in accordance with the DD text of the job control language (JCL) specified in the operating system (OS) of the host computer. As mentioned above, a plurality of files can be set in a single magnetic tape cartridge. About 10,000 files may be created in a single tape according to the current specification.

In this apparatus, VOL/SER and LABEL must be set in the operating system of the host computer. This is inconvenient for a user, and thus this system is not practically used.

This inconvenience is caused by the fact that a file cannot be set as a logical volume. Japanese Laid-Open Patent Application 6-324813 suggested a system in which a plurality of logical volumes can be set in a single volume magnetic tape. In this magnetic tape apparatus system, the magnetic tape must be rewound to an initial position when accessing a logical volume which was previously accessed. This requires a long accessing time, and thus is not efficiently used for a job shared by a plurality of users or a plurality of tasks.

SUMMARY OF THE INVENTION

It is a general object of the present invention to provide an information memory apparatus and a library apparatus in which the above-mentioned problems are eliminated.

A more specific object of the present invention is to provide an information memory apparatus and a library apparatus in which a single magnetic tape can be shared with a plurality of users or a plurality of tasks.

In order to achieve the above-mentioned objects, there is provided according to one aspect of the present invention an information memory apparatus comprising:

at least one information recording medium provided with a plurality of logical volumes, each of the logical volumes storing a set of information and being defined as a single physical volume;

at least one recording/reproducing unit for recording input information on the information recording medium and/or reproducing output information from the information recording medium;

a staging device for staging and destaging the input information to be recorded on the information recording medium and/or the output information reproduced from the information recording medium by the recording/reproducing unit; and staging device controlling means for controlling the staging device so that the staging device stages and destages the input information and/or the output information in accordance with loading and unloading of the recording/reproducing unit.

According to this invention, since a plurality of logical volumes, each of which is recognized as a single physical volume of the recording medium, are provided in a single physical volume of the recording medium, a necessary file stored in the recording medium can be easily accessed without exchanging the recording medium even if there are many volumes. Thus, a plurality of files or sets of information can be recorded on a single information recording medium. This increases recording efficiency for a single volume of the recording medium, and permits the information recording medium being shared with a plurality of users or tasks. Additionally, when the recording/reproducing unit is accessed, the output or input information is temporarily stored in the staging device. Thus, there is no need to directly access the recording/reproducing unit. Accordingly, if the information recording medium comprises a tape-like recording medium, the tape-like recording medium does not need to be rewound or fast forwarded. This reduces accessing time.

Additionally, the information memory apparatus may further comprise loading/unloading means, provided with a plurality of the information recording media, for loading one of the information recording media to the recording/reproducing unit and unloading the one of the information recording media from the recording/reproducing unit, the one of the information recording media containing one of the logical volumes which stores a set of information to be used.

According to this invention, a plurality of information recording media can be automatically loaded and unloaded. Thus, a library apparatus having an efficient information recording media control can be achieved by using this invention.

Additionally, the staging device controlling means controls the staging device so that the staging device stores the input information and the output information by relating to a corresponding one of the logical volumes.

According to this invention, the staging device can be accessed by a host computer by designating a logical volume. Thus, access to the staging device is easy.

In one embodiment of the present invention, the staging device may comprise a hard disk unit having a mirror disk construction or a construction of a redundant array of inexpensive disks.

Additionally, the information memory apparatus may further comprise a second recording/reproducing unit for recording a single physical volume on a single recording medium.

Further, the staging device may comprise a direct access storage device. The direct access storage device and the recording/reproducing unit may be connected via a bus line for transmitting information directly between the direct access storage device and the recording/reproducing unit.

Additionally, there is provided according to another aspect of the present invention a library apparatus comprising:

a cell unit storing a plurality of information recording media, each of the information recording media provided with a plurality of logical volumes, each of the logical volumes storing a set of information and being defined as a single physical volume;

at least one recording/reproducing unit for recording input information on the information recording media and/or reproducing output information from the information recording media;

a staging device for staging and destaging the input information to be recorded on the information recording media and/or the output information reproduced from the information recording media by the recording/reproducing unit; and staging device controlling means for controlling the staging device so that the staging device stages and destages the input information and/or the output information in accordance with loading and unloading of the recording/reproducing unit.

According to this invention, since a plurality of logical volumes, each of which is recognized as a single physical volume of the recording medium, are provided in a single physical volume of the recording medium, a necessary file stored in the recording medium can be easily accessed without exchanging the recording medium even if there are many volumes. Thus, a plurality of files or sets of information can be recorded on a single information recording medium. This increases recording efficiency for a single volume of the recording medium, and permits the information recording medium being shared with a plurality of users or tasks. Additionally, when the recording/reproducing unit is accessed, the output or input information is temporarily stored in the staging device. Thus, there is no need to directly access the recording/reproducing unit. Accordingly, if the recording medium comprises a tape-like recording medium, the tape-like recording medium does not need to be rewound or fast forwarded. This reduces accessing time.

Additionally, the library apparatus may further comprise loading/unloading means, provided with a plurality of the information recording media, for loading one of the information recording media to the recording/reproducing unit and unloading the one of the information recording media from the recording/reproducing unit, the one of the information recording media containing one of the logical volumes which stores a set of information to be used.

According to this invention, a plurality of information recording media can be automatically loaded and unloaded. Thus, a library apparatus having an efficient information recording media control can be achieved by using this invention.

Additionally, the staging device controlling means controls the staging device so that the staging device stores the input information and the output information by relating to a corresponding one of the logical volumes.

According to this invention, the staging device can be accessed by a host computer by designating a logical volume. Thus, access to the staging device is easy.

In one embodiment of the present invention, the staging device may comprise a hard disk unit having a mirror disk construction or a construction of a redundant array of inexpensive disks.

Other objects, features and advantages of the present invention will become more apparent from the following detailed description when read in conjunction with the accompanying drawings.

BRIEF DESCRIPTION OF THE DRAWINGS

FIG. 5 is an illustration for explaining a data structure of a cell data set according to the first embodiment of the present invention;

FIG. 6 is an illustration for explaining a data structure of an MTU table shown in FIG. 4;

FIG. 7 is an illustration for explaining a data structure of a staging table shown in FIG. 4;

FIG. 11 is an illustration for explaining contents of an area LVOL1 of the magnetic tape cartridge;

FIG. 24 is a block diagram of an information memory apparatus according to a variation of the second embodiment.

DETAILED DESCRIPTION OF THE PREFERRED EMBODIMENTS

Figure 1:
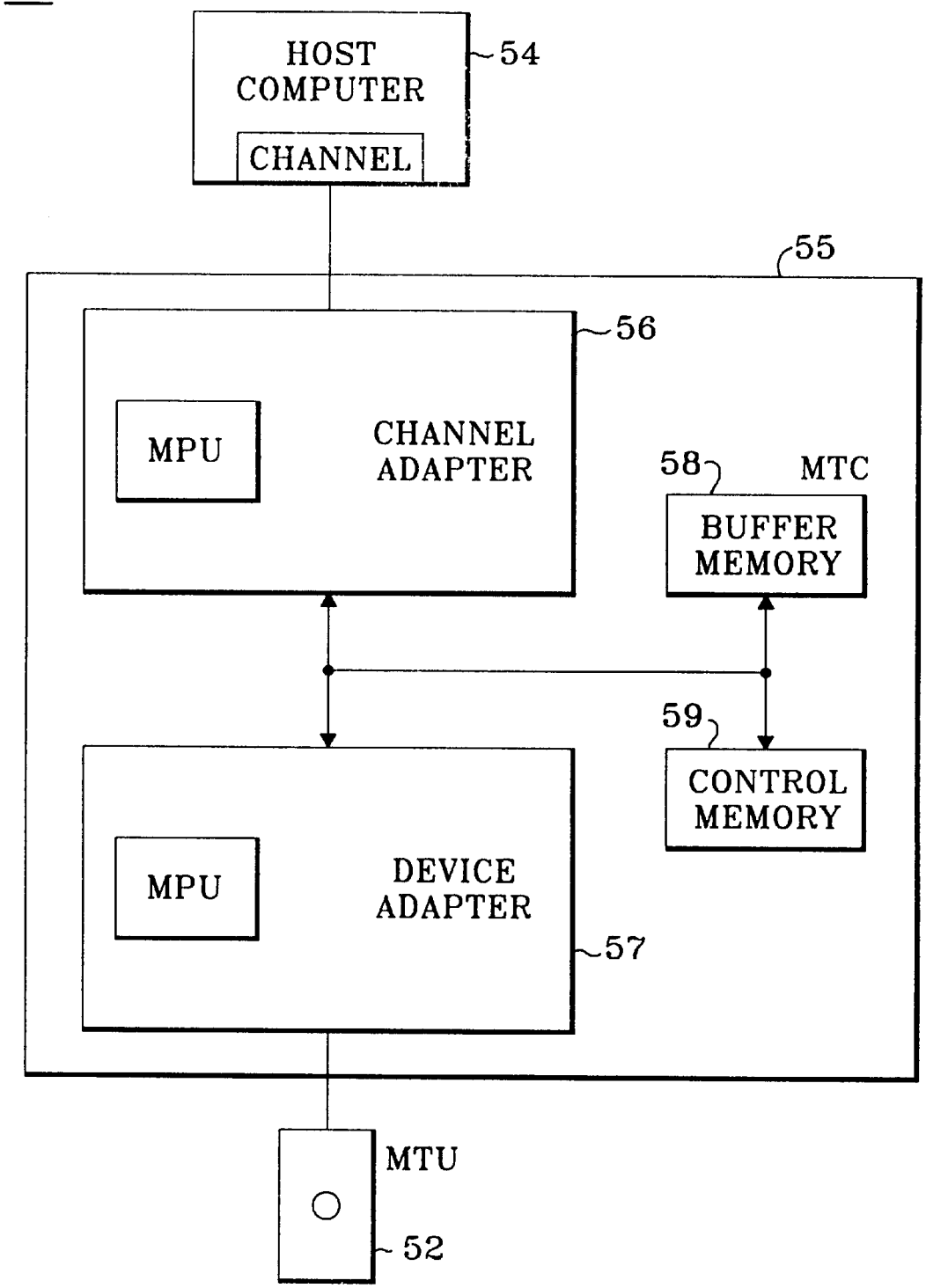
FIG. 1 is a block diagram of an example of a conventional magnetic tape memory apparatus.
Figure 2:
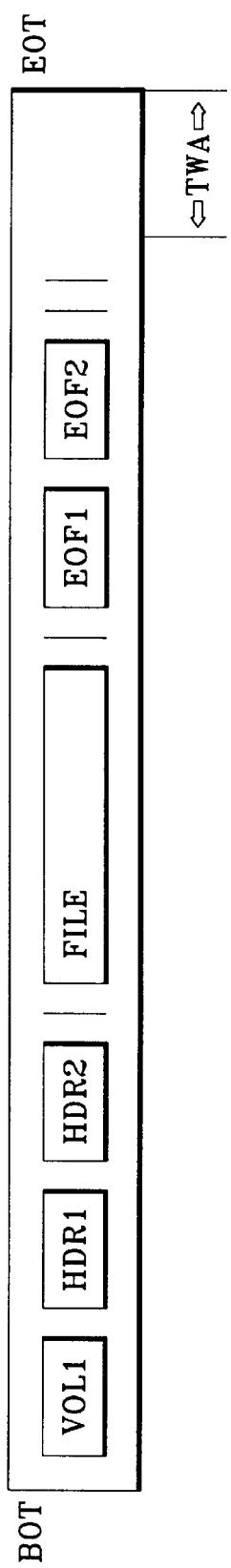
FIG. 2 is an illustration of a format of a single file recorded on a conventional magnetic tape.
Figure 3:
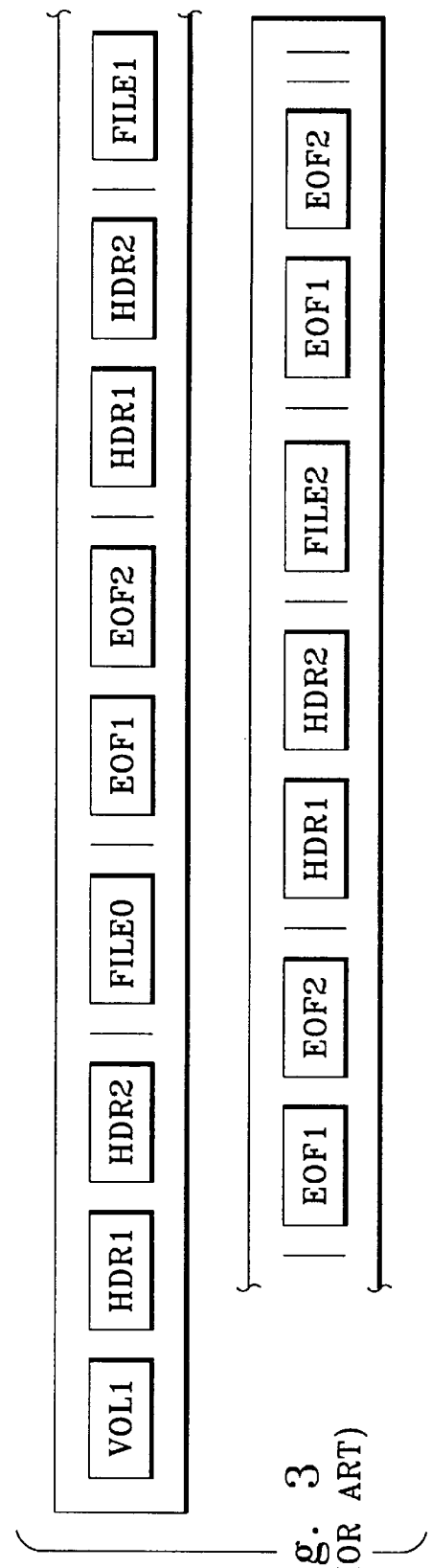
FIG. 3 is an illustration of a format of a conventional multi-file tape.
Figure 4:
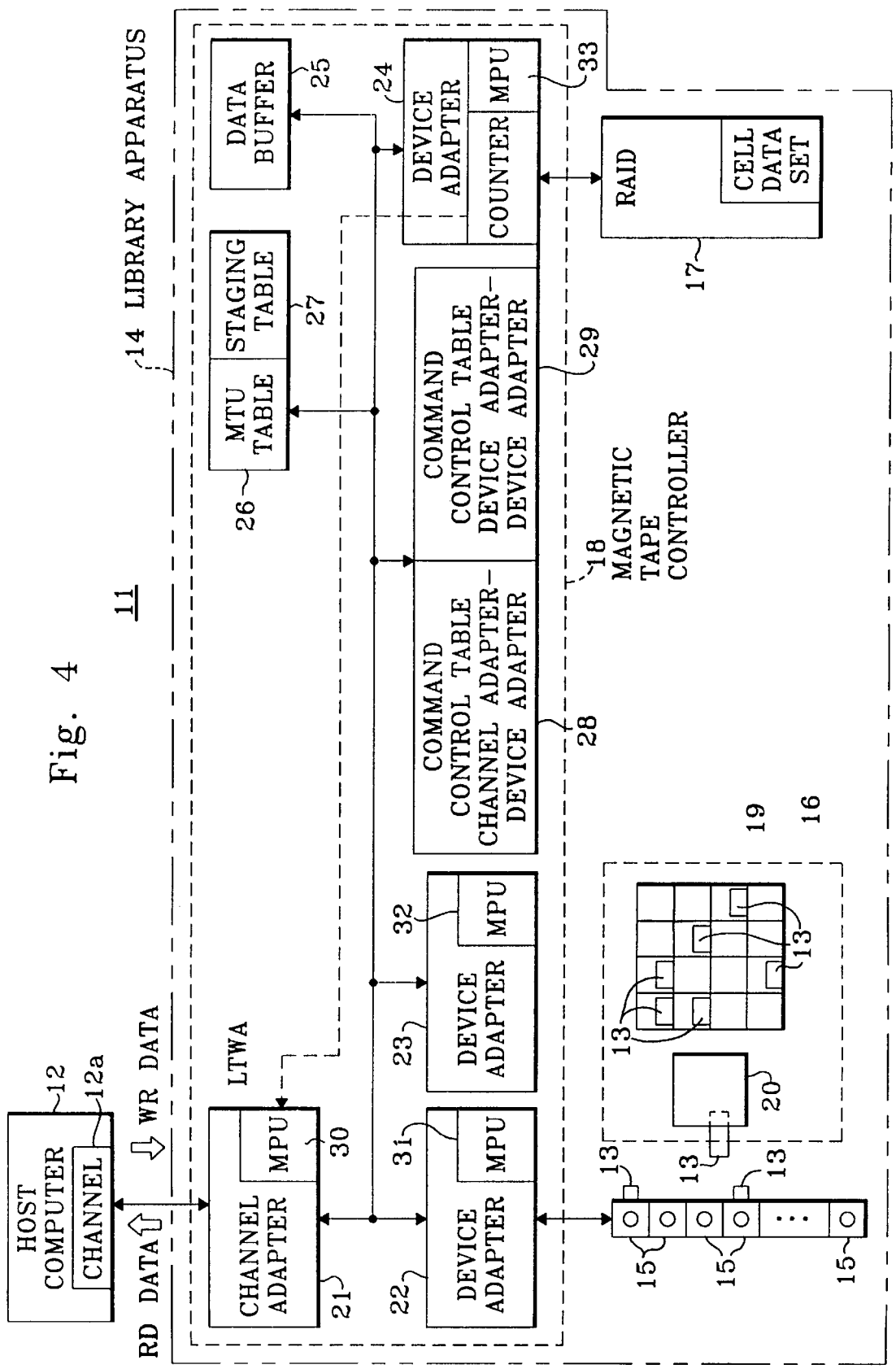
FIG. 4 is a block diagram of an information processing system using a magnetic tape memory apparatus according to a first embodiment of the present invention.

A description will now be given of a first embodiment of the present invention. FIG. 4 is a block diagram of an information processing system using a magnetic tape memory apparatus according to the first embodiment of the present invention.

The information processing system 11 shown in FIG. 4 comprises a host computer 12 for processing data and a library apparatus 14 provided with a plurality of magnetic tape cartridges 13. The library apparatus 14 selects one of the magnetic tape cartridges 13 in accordance with an instruction from the host computer to perform a recording operation or a reproducing operation.

The library apparatus 14 comprises a plurality of magnetic tape units (MTU) 15, an accessor unit 16, a hard disk unit 17 for data staging and a magnetic tape controller (MTC) 18. The magnetic tape units 15 record or reproduce information on the magnetic tape cartridges 13. The accessor unit 16 supplies the magnetic tape cartridges 13 to the magnetic tape units 15. The magnetic tape controller 18 is provided between the host computer 12 and each of the magnetic tape units 15, the accessor unit 16 and the hard disk unit 17.

The magnetic tape units 15 are loaded with the magnetic tape cartridges 13, and perform a recording operation or reproducing operation on the magnetic tape cartridges 13 in accordance with instruction from the host computer 12.

The accessor unit 16 comprises a cell unit 19 for storing the magnetic tape cartridges 13 and a for conveying unit 20 conveying the magnetic tape cartridges 13 to the magnetic tape units 15.

The hard disk unit 17 for data staging comprises a so-called redundant array of inexpensive disks (RAID) which comprises a plurality of hard disk drives redundantly arranged so that reliability of data stored in the hard disk unit 17 is increased. The hard disk unit 17 includes a cell data set (CDS) for controlling the accessor unit 16.

FIG. 5 is an illustration for explaining a data structure of the cell data set (CDS) according to the first embodiment of the present invention.

As shown in FIG. 5, the cell data set (CDS) is a set of data including cell address information representing a cell position of each magnetic tape cartridge 13 in the cell unit 19 of the accessor unit 16 and information representing a relationship between a physical volume and a logical volume established in the system. The logical volume information input from the host computer 12 is converted sequentially into a physical volume and a cell address in accordance with the cell data set (CDS). The accessor unit 16 is operated under a control based on the converted cell address so that one of the magnetic tape cartridges 13 storing necessary information is loaded into one of the magnetic tape units 15. Accordingly, the necessary magnetic tape cartridge 13 is automatically loaded into one of the magnetic tape units 15 when the logical volume information is input from the host computer 12.

The magnetic tape controller 18 comprises a channel adapter 21, device adapters 22, 23 and 24, a data buffer 25, an MTU table 26, a staging table 27 and command control tables 28 and 29. The channel adapter 21 controls a connection between a channel 12a of the host computer 12 and the magnetic tape controller 18. The device adapter 22 controls a connection to the magnetic tape units 15. The device adapter 23 controls a connection to the accessor unit 16. The device adapter 24 controls a connection to the hard disk unit 17. The data buffer 25 temporarily stores data transferred between the host computer 12 and the magnetic tape unit 15. The MTU table 26 stores information including a condition of mounting into the magnetic tape units 15, a mount volume, a name of a logical volume being used and a flag for identifying whether a processing is being performed. The staging table 27 stores information including a section of the RAID of the hard disk unit 17 which is allocated in a manner corresponding to the capacity of the logical volume. The staging table 27 also stores information including a logical block address (LBA) for accessing each section, a flag representing a condition of allocation and a name of the allocated logical volume. The command control table 28 stores information for controlling a command execution between the channel adapter 21 and the device adapter 24 connecting the hard disk unit 17. The command control table 29 stores information for controlling a command execution between the device adapters 22 and 24.

FIG. 6 is an illustration for explaining a data structure of the MTU table 26.

In the MTU table 26, MTU numbers are set such as #0, #1 and #2 for identifying the position of each magnetic tape unit 15 in the library apparatus 14. Information representing whether or not each magnetic tape unit 15 is mounted in the position corresponding to each MTU number is set by on and off. A mount volume for identifying the mounted magnetic tape unit 15 is represented by VOL#1111, VOL#1112, . . . , and a logical volume LV provided to each magnetic tape unit 15 is represented by LV#AAAA, LV#BBBB, . . . . Additionally, information (process flag) representing whether or not each logical volume is being processed is represented by on and off. For example, as shown in FIG. 6, it can be identified by referring to the MTU table 26 that the magnetic tape unit 15 set as a mount volume VOL#1111 is provided in the mount position MTU#0; the logical volumes LV#AAAA and LA#BBBB are set to the magnetic tape unit 15 set to the mount volume VOL#1111; and both of the logical volumes LV#AAAA and LA#BBBB set in the magnetic tape unit 15 are being used.

FIG. 7 is an illustration for explaining a data structure of the staging table 27.

In the staging table 27, the logical block address (LBA) $x_1x_2x_3x_4$-$y_1y_2y_3y_4$ used for accessing the redundant array of inexpensive disks (RAID) section, assigns information (on and off) representing whether or not the logical volume is present and the logical volume names LV#AAAA, LV#BBBB are set for each RAID section set in the hard disk unit 17. For example, as shown in FIG. 7, it can be identified by referring to the staging table 27 that the logical block address $x_1x_2x_3x_4$-$y_1y_2y_3y_4$ is set for the RAID section 0; and the logical volume name LV#AAAA is assigned to the RAID LV#AAAA.

Figure 8:
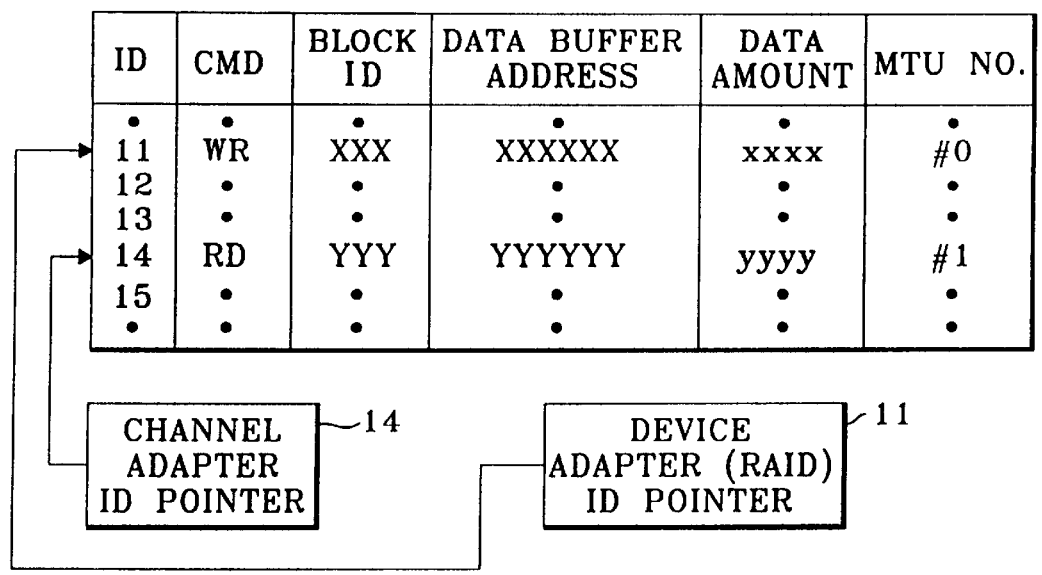
FIG. 8 is an illustration for explaining a data structure of a command control table for a channel adapter shown in FIG. 4.

FIG. 8 is an illustration for explaining a data structure of the command control table 28.

Figure 9:
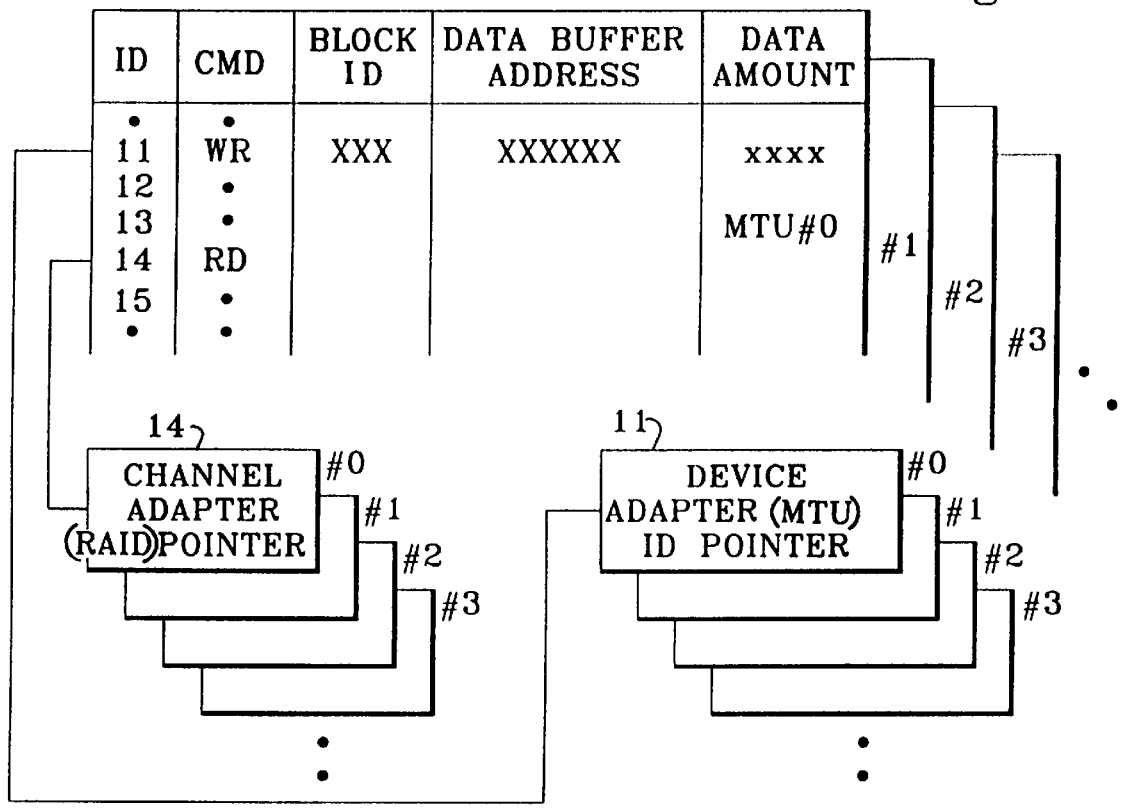
FIG. 9 is an illustration for explaining a data structure of a command control table for a device adapter shown in FIG. 4.

Identification numbers (ID) are set in the control command table 28 for identifying an input sequential order of commands. A command CMD, a block ID (BID) which is positional information specifying the position of the necessary information recorded on the magnetic tape, an amount of data to be recorded or reproduced and the number of magnetic tape unit 15 to be used for recording or reproducing are set for each (CHANNEL ADAPTER) ID number. Additionally, a CA-ID pointer and a DA-ID(DEVICE ADAPTER) pointer are provided to the command control table 28. The CA-ID pointer indicates the first ID executed by the channel adapter 21. The DA-ID pointer indicates the first ID executed by the device adapter 24 for the hard disk unit 17. Accordingly, the command to be executed for the next time and the buffer address used by the command to be executed can be identified for each magnetic tape unit 15 by referring to the command control table 28. FIG. 9 is an illustration for explaining a data structure of the command control table 29.

The command control table 29 is set for each magnetic tape unit 15. Identification numbers (ID) are set in the control command table 29 for identifying an input sequential order of commands input to the corresponding magnetic tape unit 15. A command CMD, a block ID (BID) which is positional information specifying the position of the necessary information recorded on the magnetic tape, and an amount of data to be processed when the corresponding command is executed are set for each ID number. Additionally, a DA(RAID)ID pointer and a DA(MTU)ID pointer are provided to the command control table 29. The DA(MTU)AD pointer indicates the ID number corresponding to the latest command executed by the device adapter 24. The DA(MTU)ID pointer indicates the ID number corresponding to the latest command executed by the device adapter 22. Accordingly, the command to be executed for the next time and the buffer address used by the command to be executed can be identified for each magnetic tape unit 15 by referring to the command control table 29.

It should be noted that the channel adapter 21 and the device adapters 22, 23 and 24 include main processing units (MPUs) 30, 31, 32 and 33, respectively, so that a desired magnetic tape cartridge is accessed by referring to the MTU table 26, the staging table 27, and the command control tables 28 and 29. In the present embodiment, a plurality of logical volumes are set for each of the magnetic tape cartridges 13 when the above-mentioned access is made.

Figure 10:
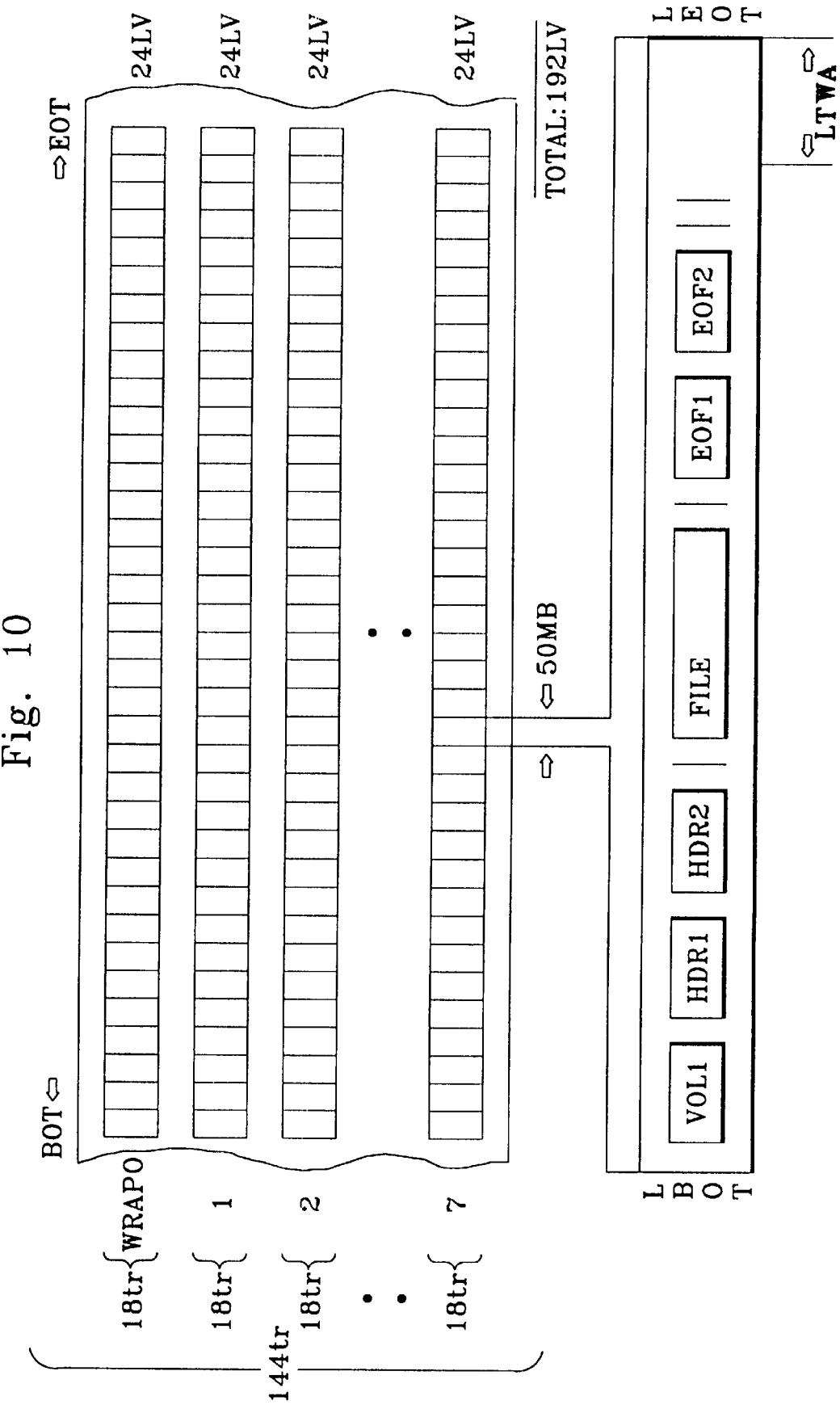
FIG. 10 is an illustration for explaining a recording format for a magnetic tape cartridge.

FIG. 10 is an illustration for explaining a recording format for the magnetic tape cartridge 13.

In the present embodiment, as shown in FIG. 10, the single-volume magnetic tape cartridge 13 is recordable with 10 GB, 144 tracks. If one lap contains 18 tracks, 8 laps can be formed on the magnetic tape. If a logical volume is set to about 50 MB, 24 logical volumes can be recorded in one lap. Thus a total of 192 logical volumes (24 LV×8 laps=192 LVs) can be recordable in the single volume magnetic tape cartridge 13.

Additionally, each logical volume includes areas VOL1, HDR1, HDR2, FILE, EOF1, EOF2 and LTWA. In the area VOL1 is recorded a name of the logical volume so as to identify the logical volume. The area HDR1 stores a header label of the data recorded in the logical volume. The area HDR2 stores a file header label of the file recorded in the logical volume. In the area FILE is recorded the file. The EOF1 stores data representing the end of the area FILE. The EOF2 stores data representing the end of the logical volume. The area LTWA (logical tape warning area) is provided for reserving an interval between the logical volumes.

Additionally, an area LVOL1 is provided at the beginning of the magnetic tape so as to indicate a summary of the logical volume to be stored in the magnetic tape. The area LVOL1 includes, as shown in FIG. 11, areas 1vol1, VOLSER, LVenable and LVOLSER. The area 1vol1 stores contents of the magnetic tape cartridge 13. The area VOLSER stores a series number of the magnetic tape. The area LVenable is provided for identifying an enabled state of the logical volume. The area LVOLSER stores series numbers for the logical volumes VL1 to LV191 and the storing positions thereof. The area LVOL1 is written when the magnetic tape cartridge 13 is initialized.

In the present embodiment, a desired file can be accessed without changing the magnetic tape cartridge by setting the logical volume by the host computer 12. This is achieved by the logical volume being handled as a physical volume. Accordingly, the host computer 12 can access a desired file by merely setting a logical volume similarly to the ordinary access to a memory apparatus.

Figure 12:
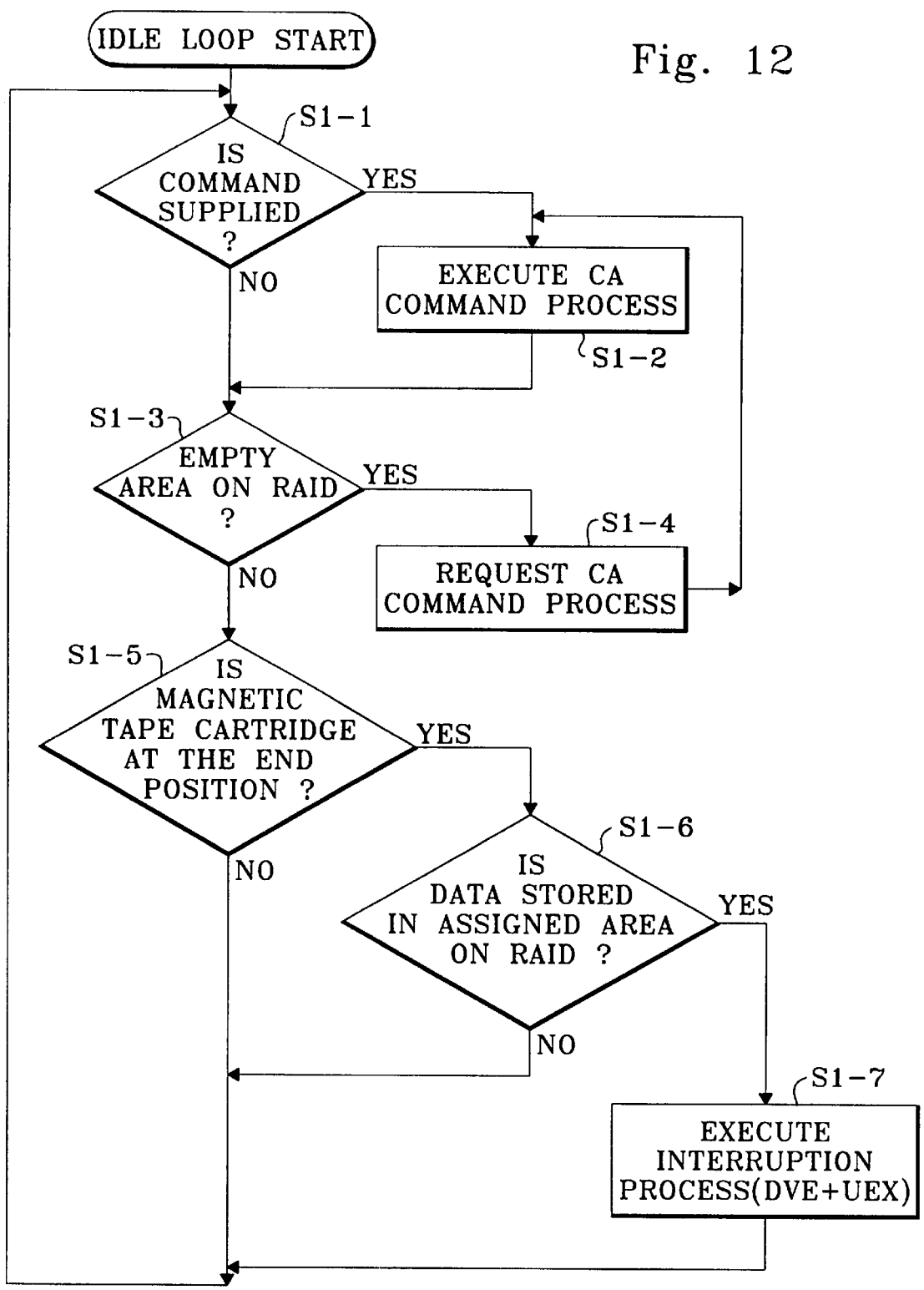
FIG. 12 is a flowchart of an operation of a channel adapter shown in FIG. 4.

A description will now be given of an operation of the channel adapter 21 of the present embodiment. FIG. 12 is a flowchart of the operation of the channel adapter 21.

When the operation shown in FIG. 12 is started, it is determined, in step S1-1, whether or not a command is supplied by the host computer 12. If it is determined that the command is supplied, the routine proceeds to step S1-2 so as to perform a CA command process for executing the command. The CA command process will be described later.

After the CA command process is completed, the routine proceeds to step S1-3. In step S1-3, it is determined whether or not an empty area exists in the hard disk unit 17 (RAID). If it is determined that an empty area exists, the routine proceeds to step S1-4 to request reexecution of the CA command process. Thus, the routine returns to step S1-2. In this step S1-2, data is stored in the empty area in the hard disk unit 17. Accordingly, the recording area of the hard disk unit 17 is controlled so that an empty area is always filled with data immediately after the empty area is generated. This allows a smooth subsequent operation of the output data to the host computer 12.

If it is determined, in step S1-3, that no empty area exists in the hard disk unit 17, the routine proceeds to step S1-5. In step S1-5, it is determined whether or not the magnetic tape cartridge 13 is at the end position. If it is determined that the magnetic tape cartridge 13 is not at the end position, the routine returns to step S1-1.

If it is determined, in step S1-5, that the magnetic tape cartridge 13 is at the end position, the routine proceeds to step S1-6. In step S1-6, it is determined whether or not data is stored in an area of the hard disk unit 17 which area is designated by the staging table 27.

If it is determined, in step S1-6, that the data is not stored in the designated area, the routine returns to step S1-1 so as to store the data in the designated area of the hard disk unit 17. On the other hand, if it is determined, in step S1-6, that the data is already stored in the designated area of the hard disk unit 17, the routine proceeds to step S1-7 so as to perform an interruption process to the host computer 12. This interruption process is performed to have the host computer 12 recognize the fact that the magnetic tape cartridge 13 is at the end position. Thereafter, the routine returns to step S1-1 to perform a process in accordance with the next command.

Figure 13:
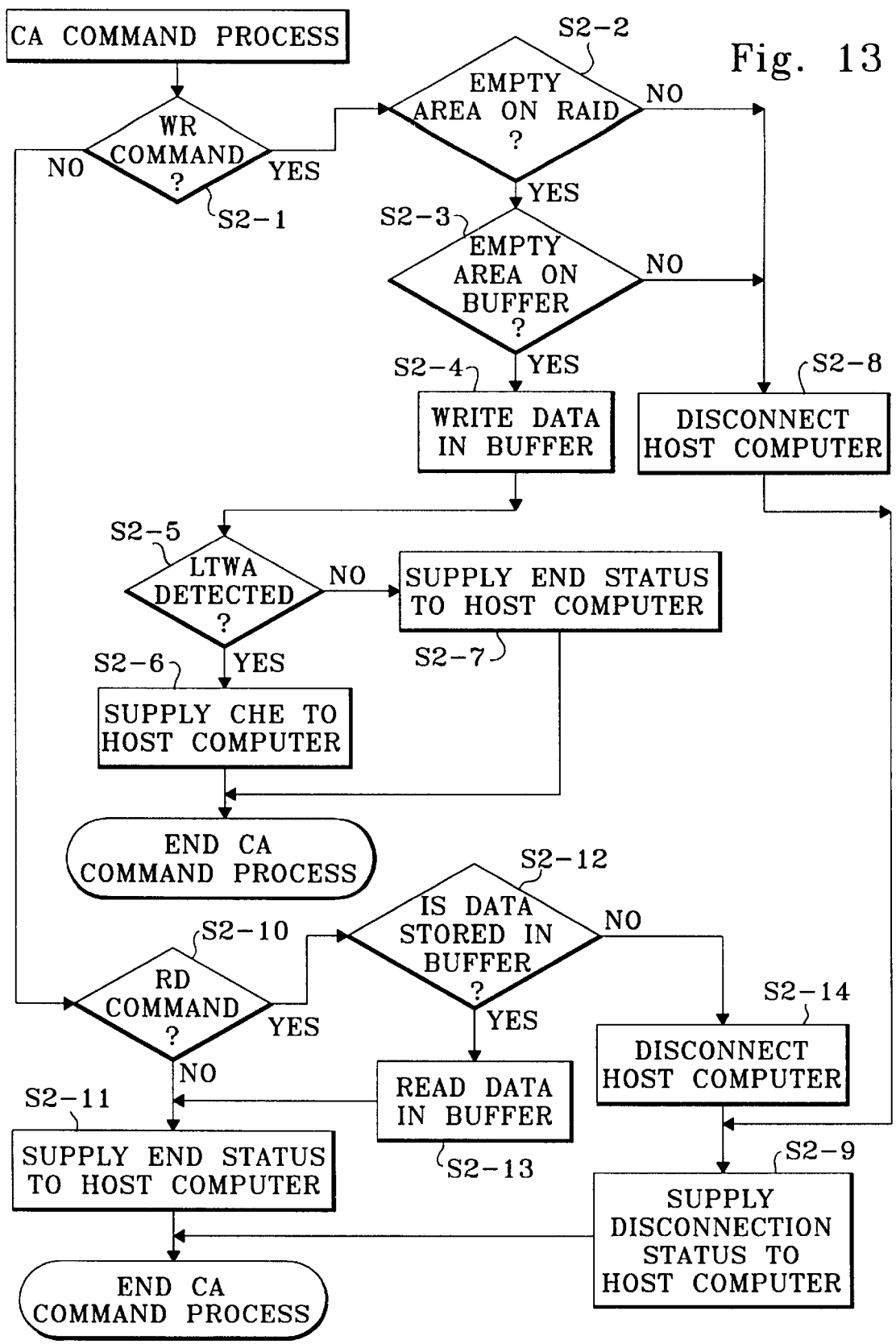
FIG. 13 is a flowchart of a CA command process.

A description will now be given of the CA command process mentioned above. FIG. 13 is a flowchart of the CA command process.

When the CA command process is started, it is determined, in step S2-1, whether or not a command supplied by the host computer 12 is a write command for writing data to the magnetic tape cartridge 13. If it is determined that the command is a write command, the routine proceeds to step S2-2. In step S2-2, it is determined whether or not an empty area exists in the hard disk unit 17. If it is determined that an empty area exists in the hard disk unit 17, the routine proceeds to step S2-3 to determine whether or not an empty area exists in the data buffer 25.

If it is determined that an empty area exists in the data buffer 25, the routine proceeds to step S2-4. In step S2-4, the data is input from the host computer 12 and written in the data buffer 25. Thereafter, the routine proceeds to step S2-5 to determine whether or not the LTWA. (the logical tope warning Area) which is provided at the end position of the magnetic tape cartridge 13, is detected.

If it is determined that the LTWA is detected, the routine proceeds to step S2-6. In step S2-6, the channel adapter 21 is disconnected from the host computer 12 by supplying a channel end status (CHE) to the host computer 12 so that the channel adapter 21 is operated in synchronization with the device adapter 24. Additionally, the contents of the command are stored in the command control table 28 which is provided for controlling the command process between the channel adapter 21 and the device adapters 22, 23 and 24. Thereafter, the CA command process is ended.

If it is determined, in step S2-5, that the LTWA is not detected, the routine proceeds to step S2-7. In step S2-7, a condition that the data is stored in the data buffer 25 is sent to the host computer 12 by supplying to the host computer 12 an end status (a channel end status (CHE)+device end status (DEV)), and the routine is ended.

If it is determined that no empty area exists in the hard disk unit 17 or in the data buffer 25 in step S2-2 or step S2-3, the routine proceeds to step S2-8. In step S2-8, the channel adapter 21 is disconnected from the host computer 12 until an empty area is generated in the hard disk unit 17 or data buffer 25, and the routine proceeds to step S2-9. In step S2-9, a disconnection status is supplied to the host computer 12, and the routine is ended. The disconnection status includes a system managing function (SMF), the channel end status (CHE) and a UCK.

If it is determined, in step S2-1, that the command supplied by the host computer 12 is not a write command, the routine proceeds to S-10 so as to determine whether or not the command is a read command for reading data from the magnetic tape cartridge 13.

If it is determined that the command is not a read command, the routine proceeds to step S2-11. In step S2-11, the end status (a channel end status (CHE)+device end status (DEV)) is supplied to the host computer 12, and the routine is ended. If it is determined, in step S2-10, that the command is a read command, the routine proceeds to step S2-12. In step S2-12, it is determined whether or not the data to be read is stored in the data buffer 25.

If it is determined that the data to be read is stored in the data buffer 25, the routine proceeds to step S2-13 so as to read the necessary data from the data buffer 25. The read data is supplied to the host computer 12, and then the routine proceeds to step S2-11 to supply the disconnection status to the host computer 21, and then the routine is ended.

If it is determined, in step S2-12, that the necessary data is not stored in the data buffer 25, the routine proceeds to step S2-14. In step S2-14, the channel adapter 21 is disconnected from the host computer 12 until the necessary data is transferred to the data buffer 25 from the magnetic disk cartridge 13 or the hard disk unit 17, and the routine proceeds to step S2-9. In step S-29, the disconnection status is supplied to the host computer 12, and the CA command process is ended.

As mentioned above, the channel adapter 21 executes the operation shown in FIGS. 12 and 13 so as to connect the library apparatus 14 to the host computer 12.

A description will now be given of operations of the device adapters 22, 23 and 24 according to the present embodiment.

Figure 14:
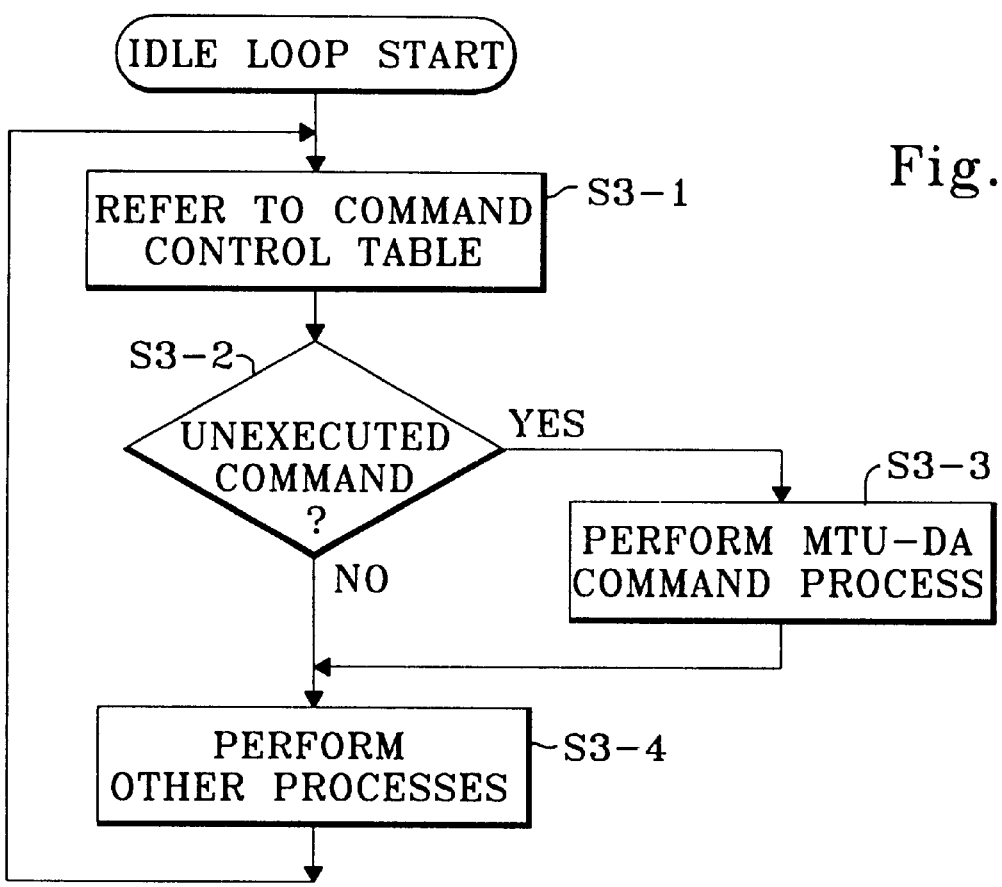
FIG. 14 is a flowchart of an operation of a device adapter which controls magnetic tape units shown in FIG. 4.

FIG. 14 is a flowchart of an operation of the device adapter 22 which controls the magnetic tape units 15.

When the operation shown in FIG. 14 is started, the device adapter 22 refers to the command control table 29 in step S3-1, and then it is determined, in step S3-2, whether or not there is an unexecuted command, which has not been executed, for the magnetic tape units 15. If it is determined that the unexecuted command is found in the command control table, the routine proceeds to steps S3-3. In step 3-3, an MTU-DA command process (which will be described later) is executed, and the routine proceeds to step S3-4. In step S3-4, other processes such as a data storing process are performed, and the routine returns to step S3-1 to refer to the command control table 29 again.

If it is determined, in step S3-2, that there is not the unexecuted command, the routine directly proceeds to step S3-4, and then returns to step S3-1.

Figure 15:
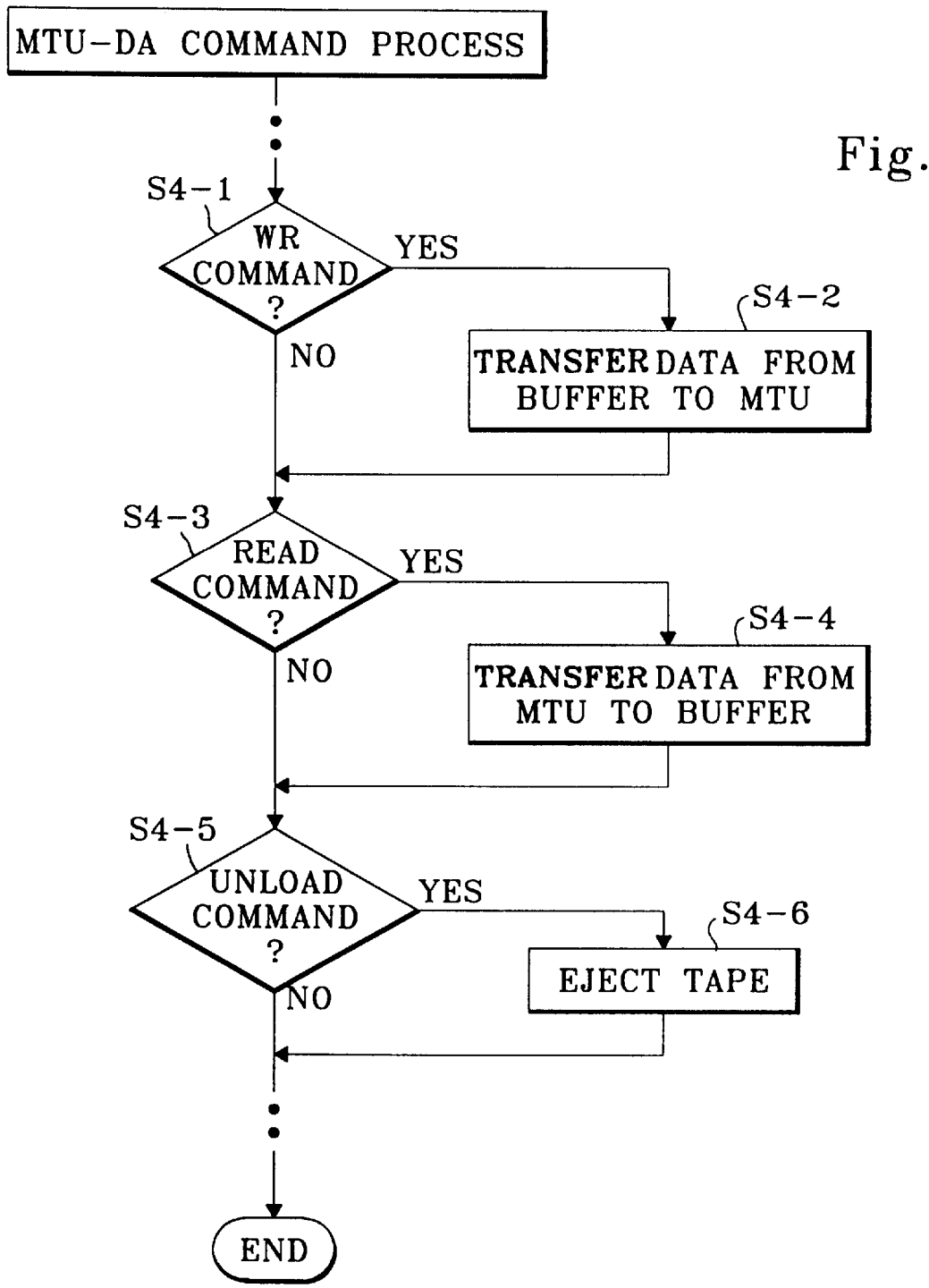
FIG. 15 is a flowchart of an MTU-DA command process.

A description will now be given of the above-mentioned MTU-DA command process. FIG. 15 is a flowchart of the MTU-DA command process.

When the MTU-DA command is started, it is determined, in step S4-1, whether or not the unexecuted command stored in the command control table 29 is a write command for writing data in the magnetic tape unit 15. If it is determined, in step S4-1, that the unexecuted command is a write command, the routine proceeds to step S4-2 to transfer the necessary data from the data buffer 25 to the magnetic tape unit 15. If it is determined, in step S4-1, that the unexecuted command is not a write command, the routine proceeds to step S4-3 so as to determine whether or not the unexecuted command is a read command for reading data from the magnetic tape cartridge 15 to supply it to the host computer 12.

If it is determined, in step S4-3, that the unexecuted command is a read command, the routine proceeds to step S4-4. In step S4-4, the data designated by the read command is transferred from the magnetic tape cartridge 13 to the data buffer 25 under is control of the magnetic tape unit 15. If it is determined, in step S4-3, that the unexecuted command is not a read command, the routine proceeds to step S4-5. In step S4-5, it is determined whether or not the unexecuted command is an unload command. If it is determined that the unexecuted command is an unload command, the routine proceeds to step S4-6 to eject the magnetic tape cartridge 13 from the magnetic tape unit 15.

As mentioned above, a process corresponding to a command is performed by referring to the command control table 29.

Figure 16:
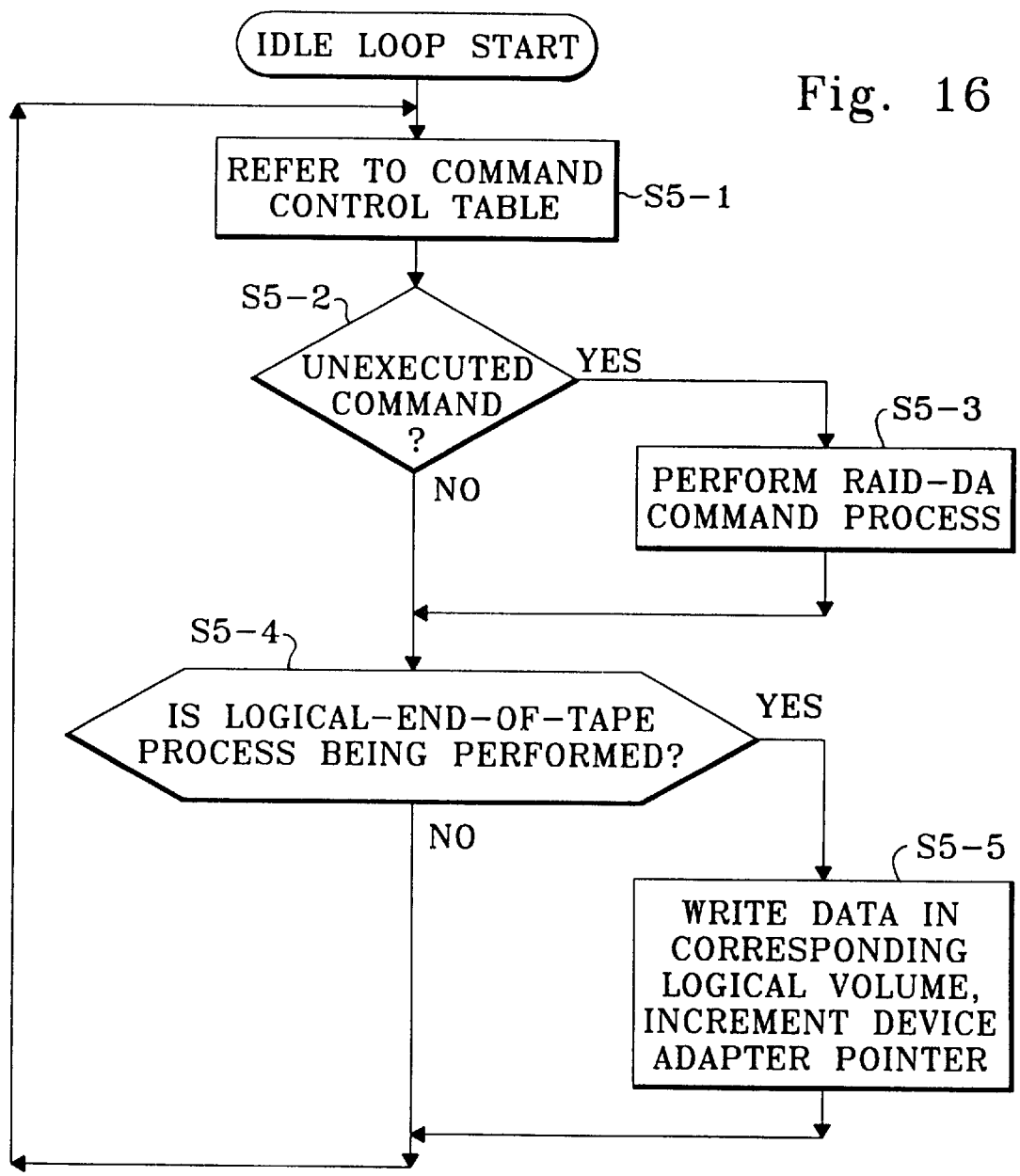
FIG. 16 is a flowchart of an operation of a device adapter for controlling a hard disk unit shown in FIG. 4.

A description will now be given of an operation of the device adapter 24 which controls the hard disk unit 17 for staging. FIG. 16 is a flowchart of the operation of the device adapter 24.

When the operation shown in FIG. 16 is started, the device adapter 24 refers to the command control tables 28 and 29 in step S5-1. Then, in step S5-2, it is determined whether or not there is remaining an unexecuted command for the hard disk unit 17 in the command control tables 28 and 29. If it is determined that an unexecuted command for the hard disk unit 17 exists, the routine proceeds to step S5-3. In step S5-3, a RAID-DA command process (which will be described later) is performed. If it is determined, in step S5-4, that an unexecuted command does not exist, the routine proceeds to step S5-4. In step S5-4, it is determined whether or not a logical end of tape (LEOT) process is being performed. The LEOT process is performed for processing data in a synchronization mode when the magnetic tape cartridge 13 reaches an end position.

If it is determined, in step S5-4, that the LEOT process is being performed, the routine proceeds to step S5-5. In step S5-5, the data on the magnetic tape cartridge is written in the corresponding logical volume in the hard disk unit 17. Additionally, the data is registered in the command control table 28, and the DA pointer in the command control table 28 is incremented.

Figure 17:
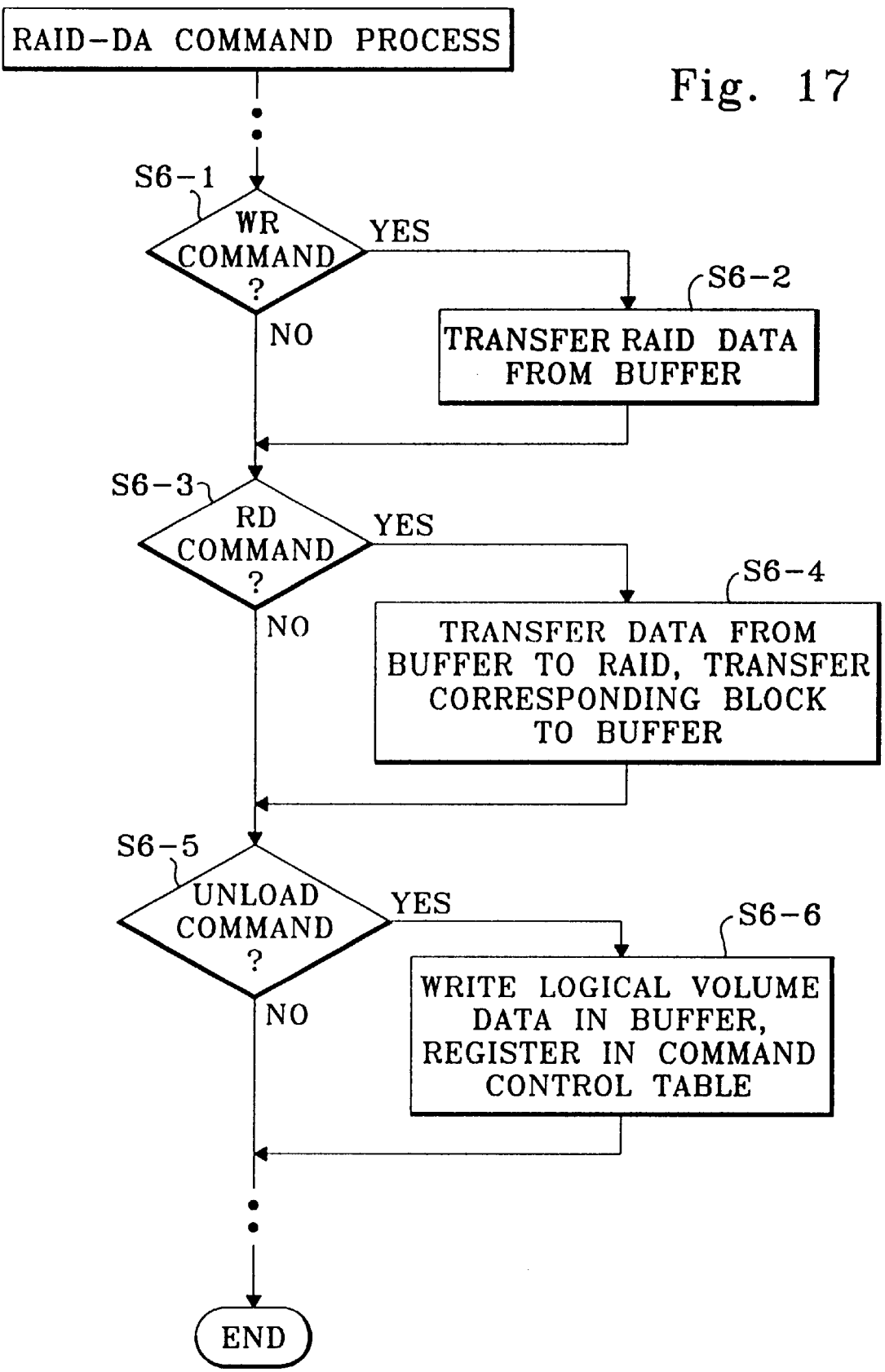
FIG. 17 is a flowchart of a RAID-DA command process.

A description will now be given of the above-mentioned RAID-DA command process. FIG. 17 is a flowchart of the RAID-DA command process.

When the RAID-DA command process is started, it is determined, in step S6-1, whether or not the unexecuted command is a write command for writing data from the data buffer 25 to the hard disk unit 17. If it is determined that the unexecuted command is a write command, the routine proceeds to step S6-2. In step S6-2, the data designated by the write command is transferred from the data buffer 25 to the hard disk unit 17.

If it is determined, in step S6-3, that the unexecuted command is a read command, the routine proceeds to step S6-4. In step S6-4, a command for transferring the data designated by the read command from the magnetic tape unit 15 to the data buffer 25 is supplied to the device adapter 22. Then, the data is transferred from the data buffer 25 to the hard disk unit 17 after the transfer of the data to the data buffer 25 is completed. When the staging of the data for the logical volume designated by the host computer 12 to the hard disk unit 17 is completed, the block retaining the data is transferred to the data buffer 25, and the host computer 12 is set in a readable state.

If it is determined, in step S6-5, that the unexecuted command is an unload command, the routine proceeds to step S6-6. In step S6-6, the data stored in the hard disk unit 17 is written in the data buffer 25, and is registered in the command control table 29.

The hard disk unit 17 is controlled according to the above-mentioned RAID-DA command process.

Figure 18:
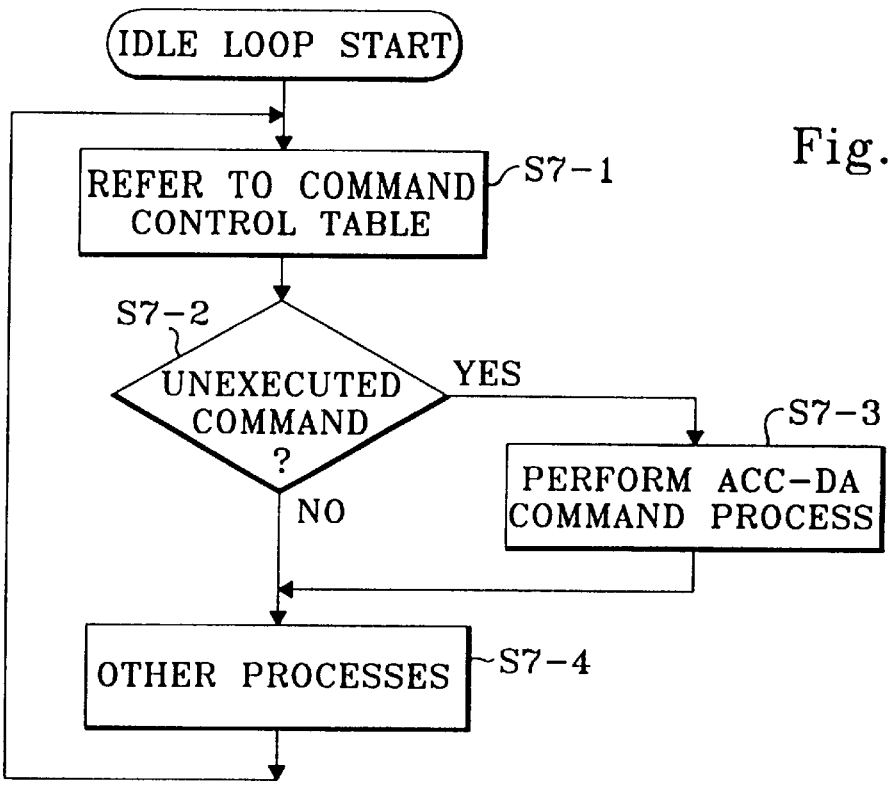
FIG. 18 is a flowchart of an operation of the device adapter for controlling an accessor unit shown in FIG. 4.

A description will now be given of an operation of the device adapter 23 for controlling the accessor unit 16. FIG. 18 is a flowchart of the operation of the device adapter 23.

When the operation shown in FIG. 18 is started, the device adapter 23 which connects the accessor unit 16 refers to the command control table 29. Then, it is determined, in step S7-2, whether or not there is remaining an unexecuted command for the accessor unit 16.

If it is determined that an unexecuted command exists, the routine proceeds step to S7-3 so as perform an ACC-DA command process (will which be described later) is performed. If it is determined that an unexecuted command does not exist, the routine proceeds to step S7-4. In step S7-4, other processes are performed, and the routine returns to step S7-1.

Figure 19:
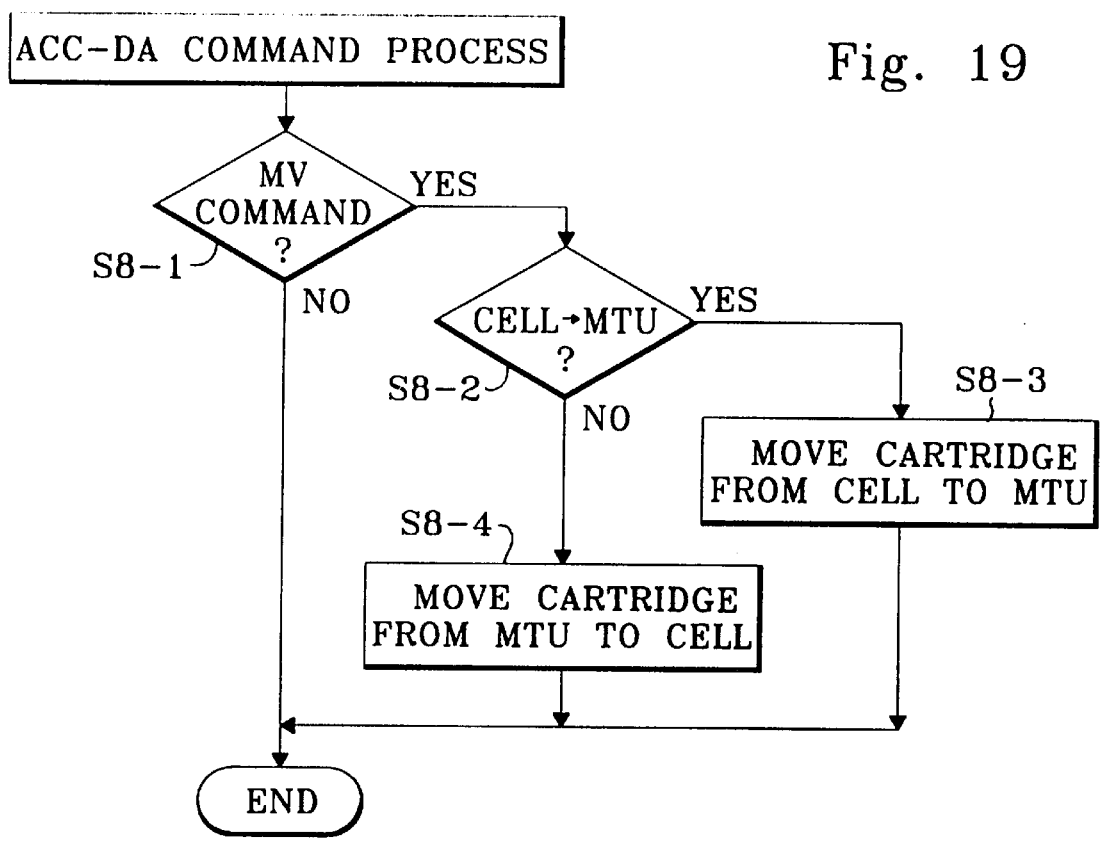
FIG. 19 is a flowchart of an ACC-DA command process.

A description will now be given of the above-mentioned ACC-DA command process. FIG. 19 is a flowchart of the ACC-DA command process.

When the ACC-DA command process is started, it is determined whether or not the unexecuted command is a move (MV) command. If it is determined that the unexecuted command is a MV command, the routine proceeds to step S8-2. In step S8-2, it is determined whether the MV command is a command for moving the magnetic tape cartridge 13 from the magnetic tape unit 15 to the cell 19 or from the cell 19 to the magnetic tape unit 15.

If it is determined that the move command is a command for moving the magnetic tape cartridge 13 from the cell 19 to the magnetic tape unit 15, the routine proceeds to step S8-3. In step S8-3, the magnetic tape cartridge 13 is moved from the cell 19 designated by the MV command to the magnetic tape unit 15 designated by the MV command, and the routine is ended.

If it is determined, in step S8-2, that the MV command is a command for moving the magnetic tape cartridge 13 from the magnetic tape unit 15 to the cell 19, the routine proceeds to step S8-4. In step S8-4, the magnetic tape cartridge 13 is moved from the magnetic tape unit 15 designated by the MV command to the cell 19 designated by the MV command, and the routine is ended.

The accessor unit 16 is controlled by the above-mentioned procedure.

A description will now be given of a write command process of the system for writing the data processed by the host computer 12 in the magnetic tape cartridge 13.

When the data processed by the host computer 12 is stored in the magnetic tape cartridge 13, the host computer 12 supplies a write command first. The write command is supplied to the channel adapter 21 of the library apparatus 14 via the channel 12a of the host computer 12. The channel adapter 21 stores the write command in the data buffer 25 when the write command is received from the host computer 12. Additionally, the channel adapter 21 registers the write command in the command control table 28 shown in FIG. 8, and increments the CA-ID pointer. Then a next command is executed.

The device adapter 24 connecting the hard disk unit 17 for staging refers to the command control table 28 shown in FIG. 8 to recognize that the write command registered by the channel adapter 21 is an unexecuted command. The device adapter 24 recognizes a storing position of the write data in the data buffer 25 from the data buffer address of the command control table 28 when the write command is recognized so as to read the write data from the data buffer to stage the read data to the hard disk unit 17.

The device adapter 24 increments the DA-ID pointer of the command control table 28 when the staging of the write data to the hard disk unit 17 is completed, and then executes a next command.

The device adapter 24 stores the staged data of the hard disk unit 17 in the data buffer 25 when the unload command, which is for ejecting the magnetic tape cartridge 13 from the magnetic tape unit 15, is recognized. Then, the device adapter 24 registers the write command in the command control table 29 shown in FIG. 9, and increments the RAID-ID pointer.

The device adapter 22, which connects the magnetic tape units 15, has a pointer in the command control table 29 shown in FIG. 9. The device adapter 22 executes an unexecuted command when it is recognized. Additionally, the device adapter 22 reads the data stored in the data buffer 25 by referring to the registered buffer address in the command control table 29 when the write command registered by the device adapter 24 is recognized. The read data is recorded in the position of the designated logical volume in the magnetic tape cartridge 13. Additionally, the device adapter 22 increments the pointer of the device adapter 22 for the magnetic tape unit 15, and then performs a next command.

The write command process is completed as mentioned above.

A description will now be given of a read command process for reading the data from the magnetic tape cartridge 13 to be supplied to the host computer 12.

When the host computer 12 needs the data already recorded on the magnetic tape cartridge 13, the host computer 12 generates a read command. The read command is supplied to the channel adapter 21 via the channel 12a of the host computer 12. The channel adapter 21 registers the read command in the command control table 28, and increments the CA-ID pointer of the command control table 28.

The device adapter 24 connecting the hard disk unit 17 registers the read command in the command control table 29 when the read command is recognized as an unexecuted command. Then, the device adapter 24 increments the pointer DA-ID, and executes a next command.

The device adapter 22 connecting the magnetic tape units 15 reads from the magnetic tape cartridge 13 the data of the logical volume corresponding to the block ID (BID) set in the command control table 29 shown in FIG. 9 by controlling the magnetic tape unit 15 when the read command is recognized as an unexecuted command by referring to the command control table 29 shown in FIG. 9. The read data is stored in the buffer address of the data buffer 25 set in the command control table 29. Then, the device adapter 22 increments the DA-ID pointer, and executes a next command.

The device adapter 24 connecting the hard disk unit 17 reads the data from the buffer address of the data buffer 25 set in the command control table 29 when the read command in the command control table 29 is recognized as an unexecuted command. The read data is staged in the hard disk unit 17, and the read command is registered in the command table 28. The device adapter 24 then increments the DA-ID pointer, and executes a next command.

The device adapter 24 transfers the read data stored in the hard disk unit 17 to the data buffer 25 when an unexecuted command is recognized in the command control table 28. Then, the device adapter 24 registers the read command in the command control table 28 together with the data buffer address of the data buffer 25 in which the data is stored.

The channel adapter 21 reads the data from the data buffer address of the data buffer 25 registered in the command control table 28 when an unexecuted command is recognized by referring to the command control table 28. The read data is supplied to the host computer 12. The channel adapter 21 increments the pointer CA-ID in the command control table 28, and then performs the read command process so that a next command is executed.

At this time, if the device adapter 24 performs the read command process twice or more (DA-ID pointer>CA-ID pointer), this means that the necessary data is stored in the data buffer 25. Thus, the channel adapter 21 transfers the data from the data buffer 245 to the host computer 12.

As mentioned above, the reading and writing processes for the magnetic tape cartridge 13 are performed.

According to the present embodiment, a plurality of logical volumes are provided in a single magnetic tape cartridge. Additionally, the magnetic tape does not need to be moved to a position each time the magnetic tape cartridge is accessed since input and output of data are performed via the hard disk unit for staging. Thus, access time is reduced. Additionally, good operability can be obtained since merely the logical volume is designated for accessing the magnetic tape cartridge by the host computer.

Additionally, a single magnetic tape cartridge can be shared with a plurality of users or a plurality of tasks by assigning each logical volume to each user or task.

In the present embodiment, although the hard disk unit 17 for staging comprises a RAID to increase reliability of information, the present invention is not limited to this construction and, for example, the hard disk unit may comprise a mirror disk in which the same data is stored in two hard disks.

Further, in the present embodiment, although the magnetic tape units 15 and the hard disk unit 17 are connected via separate device adapters, the present invention is not limited to this construction. The magnetic tape units 15 and the hard disk unit 17 may be connected via the same device adapter, and the hard disk unit for staging may be exclusively used for the magnetic tape unit connected to the same device adapter.

Additionally, in the present embodiment, the staging and destaging of the hard disk unit 17 is performed by the loading and unloading of the magnetic tape cartridge 13. However, the present invention is not limited to this construction, and the staging and destaging may be performed in accordance with load of a job applied to the library apparatus 14. That is, the library apparatus 14 detects the load of the job, and the staging and destaging may be performed when the load of the job is decreased to less than a predetermined level. This is referred to as migration management, and thus the library apparatus 14 can be used with a high efficiency. When migration management is used, more efficient use can be achieved by analyzing the frequency of use of a file according to a statistical method and a time management. That is, a specific file having a probability of being frequently used at a specific time during a day due to a routine job is priorly staged in the hard disk unit 17.

Further, in the present embodiment, the library apparatus 14 has a function to automatically change the magnetic tape cartridge. However, the present invention is not limited to this construction, and the present invention may be applied to a magnetic tape recording apparatus in which a magnetic tape cartridge is manually changed by a user. In such a case, a notification of the necessary magnetic tape cartridge is sent to the user through a display in accordance with a designation of the logical volume by using the CDS set in the hard disk unit 17.

Figure 20:
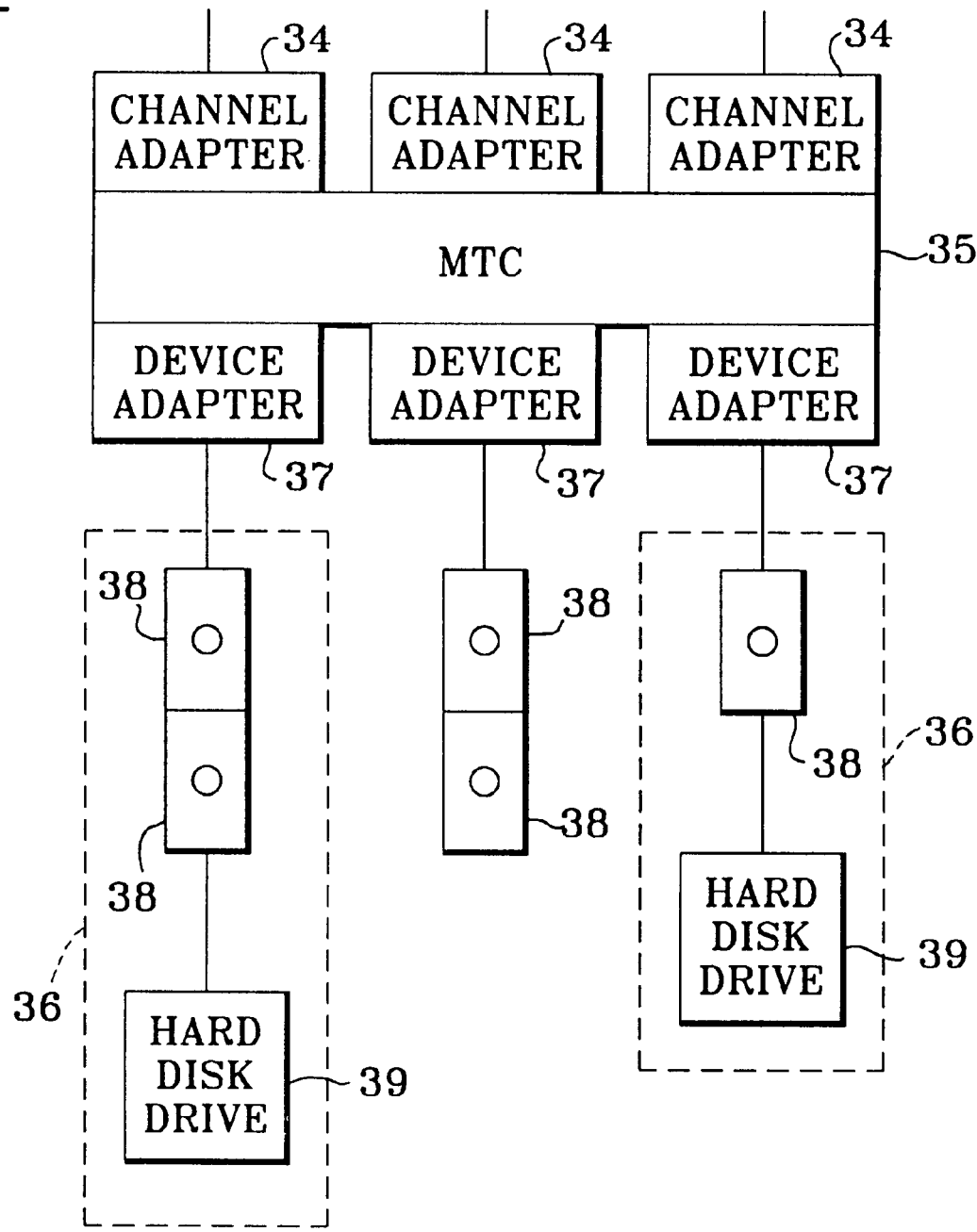
FIG. 20 is a block diagram of an information memory apparatus according to a variation of the first embodiment of the present invention.

A description will now be given of a variation of the first embodiment of the present invention. FIG. 20 is a block diagram of an information memory apparatus according to a variation of the first embodiment of the present invention.

The information memory apparatus 33 shown in FIG. 20 is connected to a plurality of host computers (not shown) which are connected to a magnetic tape controller 35 via a plurality of channel adapters 34, respectively. A plurality of magnetic tape recording units 36 are connected to the magnetic tape controller 35 via respective device adapters 37. Each of the magnetic tape recording units 36 comprises at least one magnetic tape unit 38 and a hard disk unit 39 for staging. Each hard disk unit 39 is controlled by the respective device adapter 37 so as to exclusively stage the information input and output to the respective magnetic tape unit 38.

Figure 21:
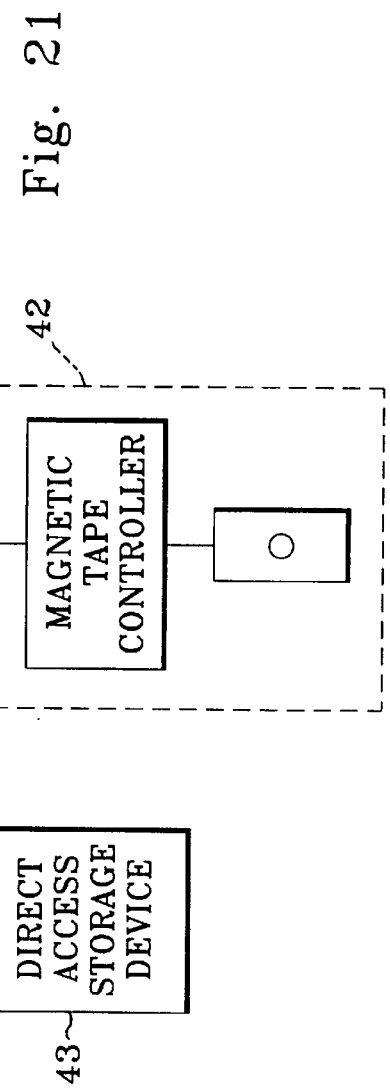
FIG. 21 is a block diagram of an information memory apparatus according to a second embodiment of the present invention.

A description will now be given of a second embodiment according to the present invention. FIG. 21 is a block diagram of an information memory apparatus according to the second embodiment of the present invention.

The information memory apparatus 40 shown in FIG. 21 comprises a host computer 41, a magnetic tape memory unit 42 for storing data processed by the host computer 41 and a direct access storage device (DASD) 43 for storing data to be stored in the magnetic tape memory unit 42.

The magnetic tape memory unit 42 and the DASD 43 are connected to channels 41a and 41b of the host computer 41, respectively, so that data is transmitted therebetween through the host computer 41.

The host computer 41 is provided with a logical volume managing unit 41c so as to manage and control the access to the magnetic tape memory unit 42 in accordance with the operating system (OS) 41d of the host computer 41.

In the magnetic tape memory unit 42, a single magnetic tape includes a plurality of logical volumes as shown in FIGS. 10 and 11 so as to store information in each logical volume.

Figure 22:
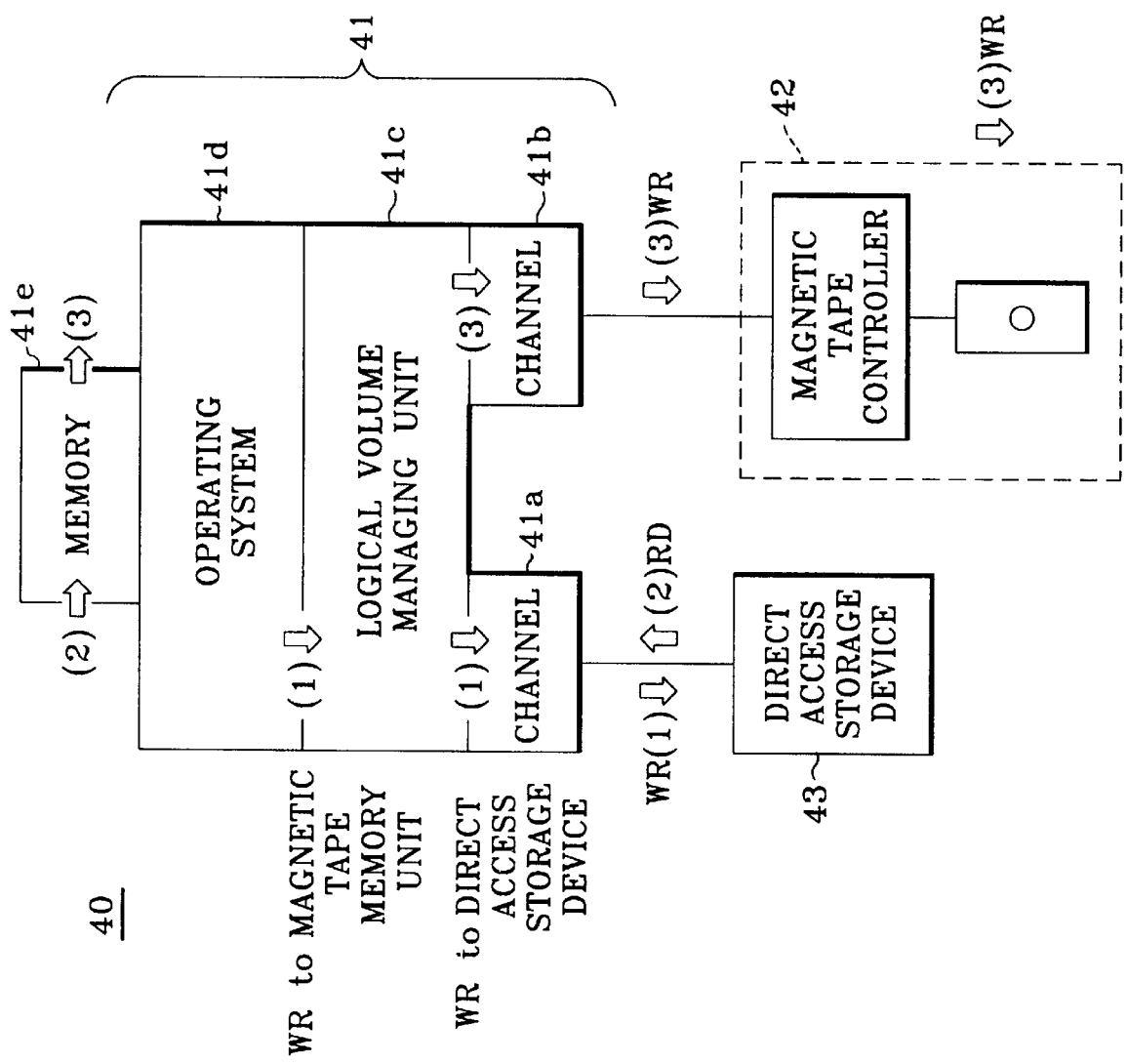
FIG. 22 is an illustration for explaining a writing operation performed by the second embodiment.

A description will now be given of a writing operation for writing data in the magnetic tape memory unit 42. FIG. 22 is an illustration for explaining the writing operation performed by the second embodiment.

When a write command for writing information on the magnetic tape of the magnetic tape memory unit 42 is generated by the operation system 41d of the host computer 41, the write command and a logical volume are supplied to the logical volume managing unit 41c of the host computer 41. The logical volume managing unit 41c converts the designated write command and the logical volume into a write command and a logical volume for the Direct Access Storage Device (DASD) 43. The logical volume managing unit 41c controls the DASD 43 so as to store the converted read command and the logical volume in the DASD. This process is indicated by arrows (1) in FIG. 22.

The DASD 43 supplies the read command to the logical volume managing unit 41c when data corresponding to a single logical volume is stored. The logical volume managing unit 41c receives the read command from the DASD 43, and transfers the data stored in the DASD 43, which data is to be supplied to the magnetic tape memory unit 42, to a memory 41e of the host computer 41. This process is indicated by arrows (2) in FIG. 22.

The logical volume managing unit 41c supplies a write command and the logical volume to the magnetic tape memory unit 42 after the data stored in the DASD 43 is transferred to the memory 41e. The logical volume managing unit 41c then stores the write data in the logical volume of the magnetic tape designated by the host computer 41. This process is indicated by arrows (3) in FIG. 22.

Figure 23:
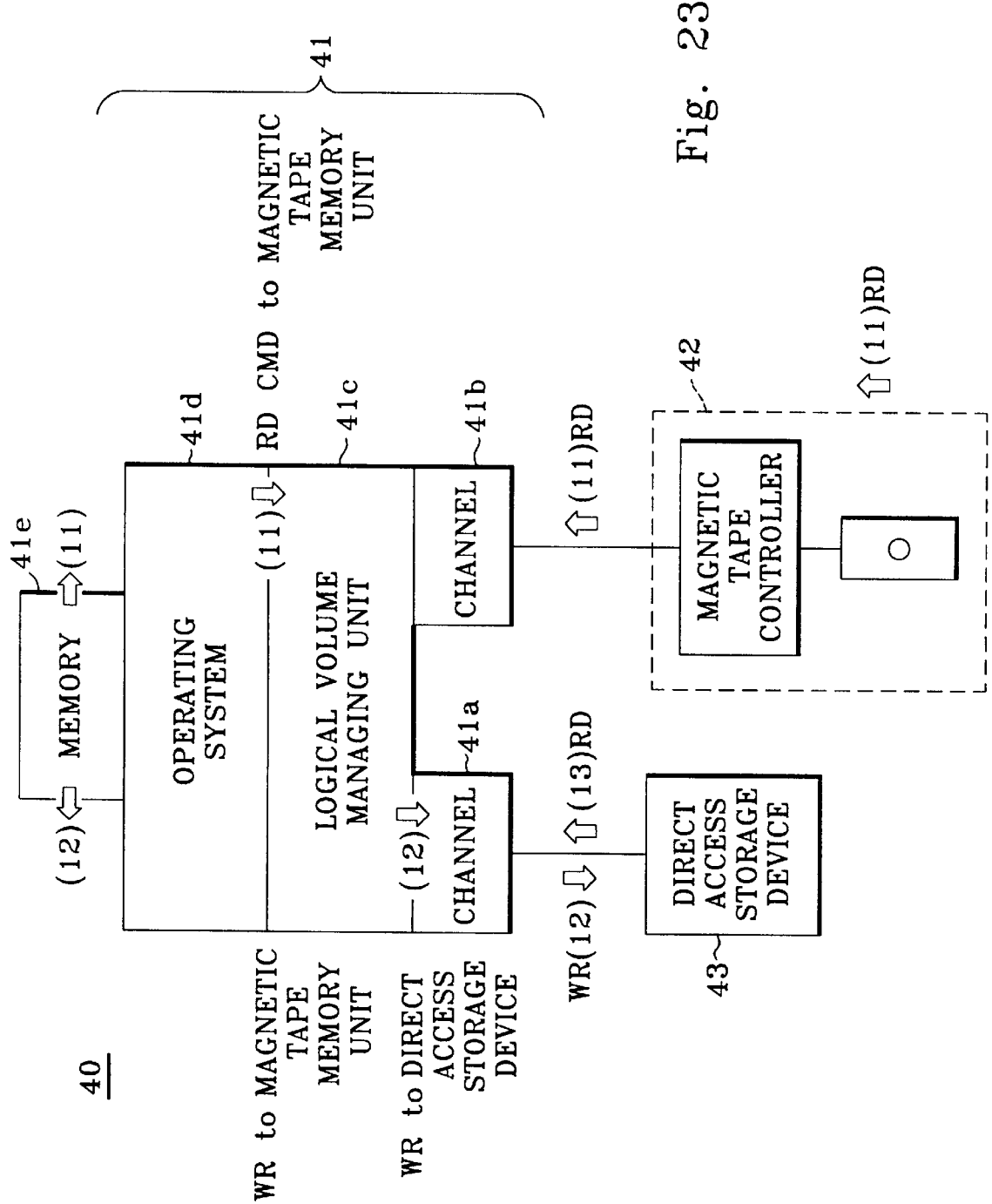
FIG. 23 is an illustration for explaining a reading operation performed by the second embodiment.

A description will now be given of a reading operation for reading data in the magnetic tape memory unit 42. FIG. 23 is an illustration for explaining the reading operation performed by the second embodiment.

The operating system 41d of the host computer 41 supplies a read command to the magnetic tape memory unit 42 when data stored in the magnetic tape memory unit 42 is needed. The magnetic tape memory unit 42 reads the data of the logical volume designated by the read command, and supplies the data to the memory 41e of the host computer 41. This process is indicated by arrows (11) in FIG. 23.

The logical volume managing unit 42 supplies a write command to the DASD 43 after the data is transferred to the memory 41e of the host computer 41 so that the data stored in the memory 41e is stored in the DASD 43. This process is indicated by arrows (12) in FIG. 23.

The logical volume managing unit 41c then supplies a read command to the DASD 43 after the data stored in the memory 41e of the host computer 41 so that the necessary data for the logical volume is supplied to the OS 41d. This process is indicated by an arrow (13) in FIG. 23.

According to the present embodiment, the host computer 41 can read the data in the magnetic tape memory unit 42 by merely accessing the logical volume set in the magnetic tape while staging the data through the DASD 43 by the logical volume managing unit 41c.

A description will now be given of a variation of the second embodiment according to the present invention. FIG. 24 is a block diagram of an information memory apparatus 50 according to the variation of the second embodiment. In FIG. 24, parts that are the same as the parts shown in FIG. 21 are given the same reference numerals, and descriptions thereof will be omitted.

In the information memory apparatus 50 shown in FIG. 24, the DASD and the magnetic tape memory unit 42 are connected to each other by an exclusive bus 44. Thus, data transfer between the DASD 43 and the magnetic tape memory unit 42 is performed via the exclusive bus 44.

In this variation, a copy command is supplied from the host computer 41 to the DASD 43 and the magnetic tape memory unit 42 so that the data transfer is performed via the exclusive bus 44 in accordance with the copy command. It should be noted that the data transfer between the host computer 41 and the magnetic tape memory unit 42 is performed via an exclusive bus 46.

According to the present variation, an occupying rate of the channels of the host computer can be reduced since the data transfer between the DASD 43 and the magnetic tape memory unit 42 is performed via the exclusive bus 44.

The present invention is not limited to the specifically disclosed embodiments, and variations and modifications may be made without departing from the scope of the present invention.

What is claimed is:

1. An information memory apparatus comprising:
   at least one information recording medium provided with a plurality of logical volumes, each of said logical volumes storing a set of information and being defined as a single physical volume;
   at least one recording/reproducing unit for recording input information on said information recording medium and/or for reproducing output information from said information recording medium, said input and/or output information including one or more selected said logical volumes;
   a data buffer for temporarily storing information transferred between a host computer and said at least one recording/reproducing unit;
   a staging device for staging and destaging the input information to be recorded on said information recording medium and/or the output information reproduced from said information recording medium by said recording/reproducing unit, said staging device staging said input information in redundant non-volatile memory; and
   staging device controlling means for controlling said staging device so that said staging device stages and destages the input information and/or the output information in accordance with loading and unloading of said recording/reproducing unit, independently of the host computer.

2. The information memory apparatus as claimed in claim 1, further comprising loading/unloading means, provided with a plurality of said information recording media, for loading one of said information recording media to said recording/reproducing unit and unloading said one of said information recording media from said recording/reproducing unit, said one of said information recording media containing one of said logical volumes which stores a set of information to be used.

3. The information memory apparatus as claimed in claim 2, wherein said staging device controlling means controls said staging device so that said staging device stores the input information and the output information by relating to a corresponding one of said logical volumes.

4. The information memory apparatus as claimed in claim 1, wherein said staging device controlling means controls said staging device so that said staging device stores the input information and the output information by relating to a corresponding one of said logical volumes.

5. The information memory apparatus as claimed in claim 1, wherein said staging device comprises a hard disk unit.

6. The information memory apparatus as claimed in claim 5, wherein said hard disk unit comprises a mirror disk construction.

7. The information memory apparatus as claimed in claim 5, wherein said hard disk unit comprises a construction of a redundant array of inexpensive disks.

8. The information memory apparatus as claimed in claim 1, further comprising a second recording/reproducing unit for recording a single physical volume on a single recording medium.

9. The information memory apparatus as claimed in claim 1, wherein said staging device comprises a direct access storage device.

10. The information memory apparatus as claimed in claim 9, wherein said direct access storage device and said recording/reproducing unit are connected via a bus line for transmitting information directly between said direct access storage device and said recording/reproducing unit.

11. A library apparatus comprising:
    a cell unit storing a plurality of information recording media, each of said information recording media provided with a plurality of logical volumes, each of said logical volumes storing a set of information and being defined as a single physical volume;
    at least one recording/reproducing unit for recording input information on said information recording media and/or for reproducing output information from said information recording media, said input/output information including one or more said logical volumes;
    a data buffer for temporarily storing information transferred between a host computer and said at least one recording/reproducing unit;
    a staging device for staging and destaging the input information to be recorded on said information recording media and/or the output information reproduced from said information recording media by said recording/reproducing unit, said staging device staging said input information in redundant non-volatile memory; and
    staging device controlling means for controlling said staging device so that said staging device stages and destages the input information and/or the output information in accordance with loading and unloading of said recording/reproducing unit, independently of the host computer.

12. The library apparatus as claimed in claim 11, further comprising loading/unloading means for loading one of said information recording media to said recording/reproducing unit and unloading said one of said information recording media from said recording/reproducing unit, said one of said information recording media containing one of said logical volumes which stores a set of information to be used.

13. The library apparatus as claimed in claim 12, wherein said staging device controlling means controls said staging device so that said staging device stores the input information and the output information by relating to corresponding one of said logical volumes.

14. The library apparatus as claimed in claim 11, wherein said staging device controlling means controls said staging device so that said staging device stores the input information and the output information by relating to a corresponding one of said logical volumes.

15. The library apparatus as claimed in claim 11, wherein said staging device comprises a hard disk unit.

16. The library apparatus as claimed in claim 15, wherein said hard disk unit comprises a mirror disk construction.

17. The library apparatus as claimed in claim 15, wherein said hard disk unit comprises a construction of a redundant array of inexpensive disks.

18. An information memory apparatus comprising:
a cell unit for storing a plurality of information recording mediums provided with a plurality of logical volumes, each of said logical volumes for storing a set of information and being defined as a single physical volume;
a reproducing unit for reproducing selected information from said information recording mediums, said selected information including one or more said logical volumes;
a data buffer for temporarily storing the selected information transferred between a host computer and said reproducing unit;
a staging device for staging the selected information to be reproduced from an information recording medium by said reproducing unit, said staging device staging said selected information in redundant non-volatile memory; and
staging device controlling means, which operates in accordance with receiving a loading command indicating that an information recording medium is to be loaded into said reproducing unit from the cell unit, for controlling said staging device so that said staging device stages the set of information as a whole from information stored in said loaded information recording medium, independently of the host computer.

19. An information memory apparatus comprising:
a cell unit storing a plurality of information recording mediums provided with a plurality of logical volumes, each of said logical volumes for storing a set of information and being defined as a single physical volume;
a reproducing unit for reproducing the information from said information recording mediums;
a data buffer for temporarily storing information transferred between a host computer and said reproducing unit;
a staging device for staging selected information to be reproduced from an information recording medium by said reproducing unit, said selected information including one or more of said logical volumes, said staging device staging said selected information in redundant non-volatile memory; and
staging device controlling means, which operates in accordance with receiving an unloading command indicating that an information recording medium is to be unloaded from said reproducing unit to the cell unit, for controlling said staging device so that said staging device destages the set of information as a whole from information stored in said unloaded information recording medium, independently of the host computer.

20. An information memory apparatus comprising:
a controller for controlling an information stored in an information recording medium provided with a plurality of logical volumes, each of said logical volumes for storing a set of information and being defined as a single physical volume;
a staging device for staging selected information to be reproduced from an information recording medium by a reproducing unit, said selected information including one or more of said logical volumes, said staging device staging said selected information in redundant non-volatile memory;
a data buffer for temporarily storing information transferred between a host computer and the reproducing unit; and
staging device controlling means, which operates in accordance with receiving a loading command indicating than an information recording medium is to be loaded into said reproducing unit from the cell unit, for controlling said staging device so that said staging device stages the set of information as a whole from information stored in said loaded information recording medium, independently of the host computer.

21. An information memory apparatus comprising:
a controller for controlling an information stored in an information recording medium provided with a plurality of logical volumes, each of said logical volumes for storing a set of information and being defined as a single physical volume;
a staging device for staging selected information to be reproduced from an information recording medium by a reproducing unit, said selected information including one or more of said logical volumes, said staging device staging said selected information in redundant non-volatile memory;
a data buffer for temporarily storing information transferred between a host computer and the reproducing unit; and
staging device controlling means, which operates in accordance with receiving an unloading command indicating that an information recording medium is to be unloaded from said reproducing unit to the cell unit, for controlling said staging device so that said staging device destages the set of information as a whole from information stored in said unloaded information recording medium, independently of the host computer.

22. An information memory apparatus comprising:
a cell unit for storing a plurality of information recording mediums provided with a plurality of logical volumes, each of said logical volumes for storing a set of information and being defined as a single physical volume;
a reproducing unit for reproducing the information from said information recording mediums;
a data buffer for temporarily storing information transferred between a host computer and said reproducing unit;
a staging device for staging selected information to be reproduced from an information recording medium by said reproducing unit, the selected information including one or more of said volumes, said staging device staging said selected information in redundant non-volatile memory; and
staging device controlling means, which operates in accordance with receiving an access command indicating that one of the plurality of logical volumes stored in the information recording medium is to be accessed, for controlling said staging device so that said staging device stages the set of information as a whole from one of the plurality of logical volumes stored in the information recording medium, independently of the host computer.

23. An information memory apparatus comprising:
a controller for controlling an information stored in an information recording medium provided with a plurality of logical volumes, each of said logical volumes for storing a set of information and being defined as a single physical volume;

a staging device for staging selected information to be reproduced from an information recording medium by a reproducing unit, the selected information including one or more of said logical volumes, said staging device staging said selected information in redundant non-volatile memory;

a data buffer for temporarily storing information transferred between a host computer and the reproducing unit; and staging device controlling means, which operates in accordance with receiving an access command indicating that one of the plurality of logical volumes stored in the information recording medium is to be accessed, for controlling said staging device so that said staging device stages the set of information as a whole from one of the plurality of logical volumes stored in the information recording medium, independently of the host computer.

* * * * *

UNITED STATES PATENT AND TRADEMARK OFFICE
CERTIFICATE OF CORRECTION

PATENT NO. : 5,940,849
DATED : August 17, 1999
INVENTOR(S) : Koyama

It is certified that error appears in the above-identified patent and that said Letters Patent is hereby corrected as shown below:

<u>Title page,</u>
"Under [73] Assignee", please delete "SUIMYN" and insert -- SUTMYN -- therefor Signed and Sealed this Eighteenth Day of September, 2001

*Attest:*

NICHOLAS P. GODICI
*Attesting Officer*     *Acting Director of the United States Patent and Trademark Office*